United States Patent [19]
Yoshizawa

[11] Patent Number: 5,864,523
[45] Date of Patent: Jan. 26, 1999

[54] OBJECTIVE LENS DRIVING APPARATUS

[75] Inventor: Takashi Yoshizawa, Yokohama, Japan

[73] Assignee: Kabushiki Kaisha Toshiba, Kawasaki, Japan

[21] Appl. No.: 745,791

[22] Filed: Nov. 8, 1996

[30] Foreign Application Priority Data

Nov. 10, 1995 [JP] Japan ..................................... 7-293166

[51] Int. Cl.$^6$ ..................................................... G11B 7/00
[52] U.S. Cl. ........................ 369/44.23; 369/112; 369/58; 369/118; 369/94
[58] Field of Search .......................... 369/112, 58, 44.19, 369/44.23, 44.24, 44.11, 118, 44.12, 44.14, 44.37

[56] References Cited

U.S. PATENT DOCUMENTS

| | | | |
|---|---|---|---|
| 5,235,581 | 8/1993 | Miyagawa et al. | 369/112 |
| 5,673,247 | 9/1997 | Sekimoto et al. | 369/112 |
| 5,687,154 | 11/1997 | Tsuchiya et al. | 369/112 |
| 5,729,510 | 6/1995 | Kasahara et al. | 369/58 |

FOREIGN PATENT DOCUMENTS

| | | |
|---|---|---|
| 0 228055A3 | 12/1986 | European Pat. Off. . |
| 0 228055A2 | 7/1987 | European Pat. Off. . |
| 0 470807A1 | 2/1992 | European Pat. Off. . |
| 0727776 | 8/1996 | European Pat. Off. ................. 369/58 |
| 63-33255 | 12/1994 | Japan ...................................... 359/58 |
| 07037259 | 2/1995 | Japan . |
| 2 086 568 | 5/1982 | United Kingdom . |

*Primary Examiner*—Nabil Hindi
*Attorney, Agent, or Firm*—Pillsbury Madison & Sutro LLP

[57] ABSTRACT

A lens holder is provided with objective lenses of different types. Rotating the lens holder causes one of the objective lenses to be placed in the optical path of the laser beam. Near one objective lens, there is provided a reflecting element that reflects part of the laser beam directed to the objective lens. When the objective lens is put in the optical path, the beam from the reflecting element is sensed by a sensor. From the sensing result, it is judged that a specific type of objective lens is in the optical path. Accordingly, there is provided an objective lens driving apparatus that includes at least two objective lenses with different numerical apertures according to optical information recording mediums complying with different standards, is capable of switching between the objective lenses according to the optical information recording medium to be used, and further has a simple structure capable of identifying the type of the objective lens selected by switching.

8 Claims, 15 Drawing Sheets

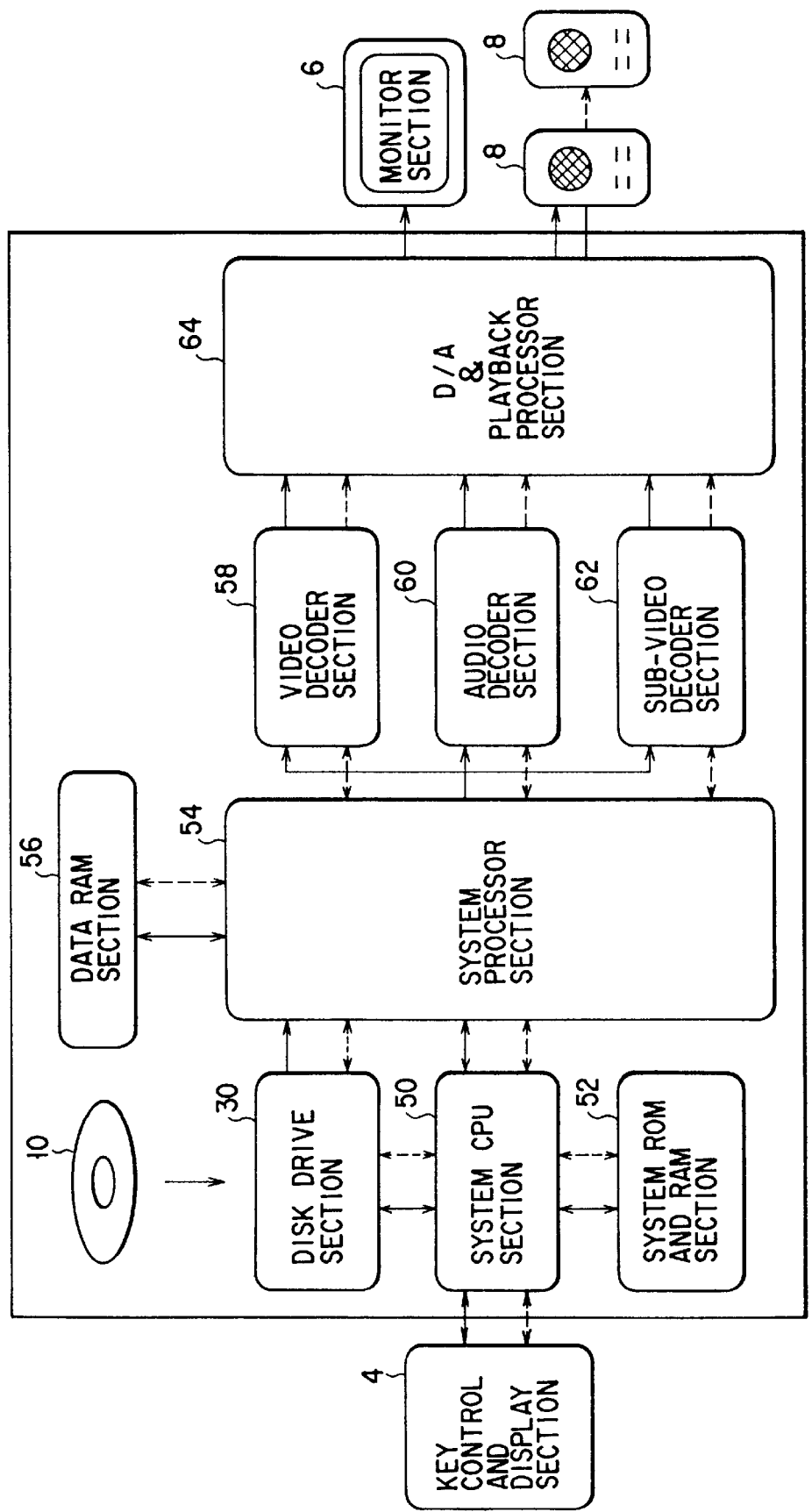
F I G. 1

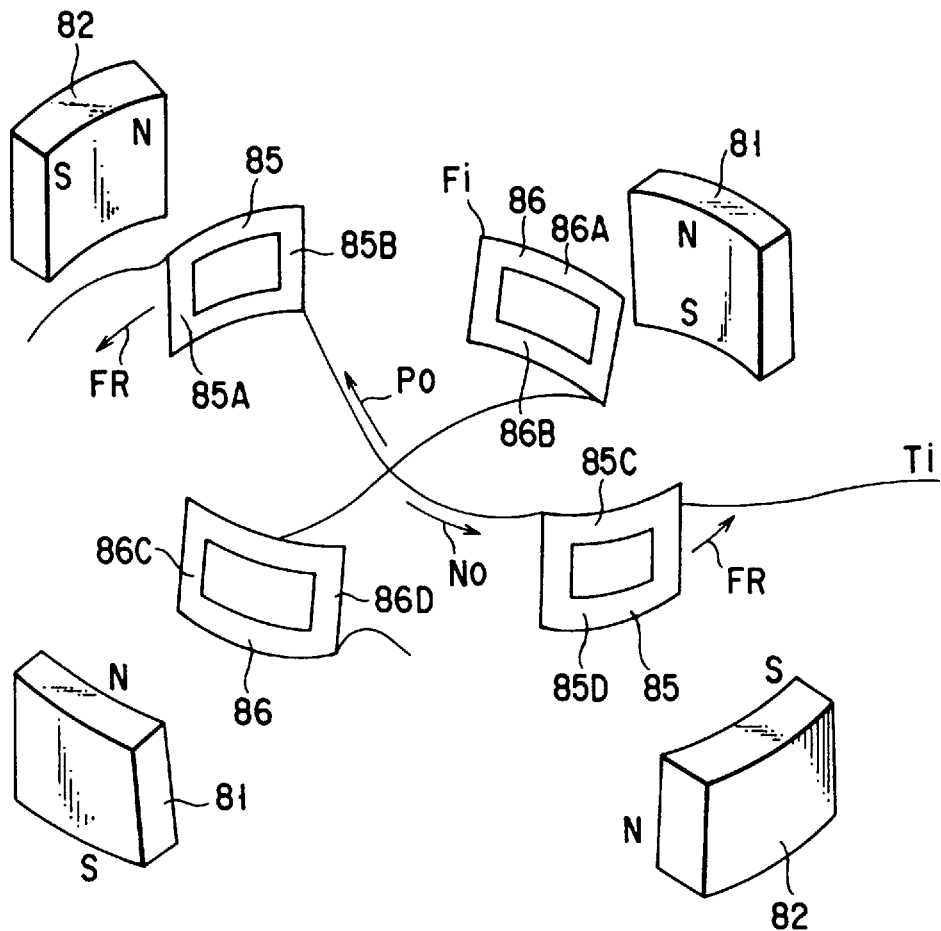
F I G. 11
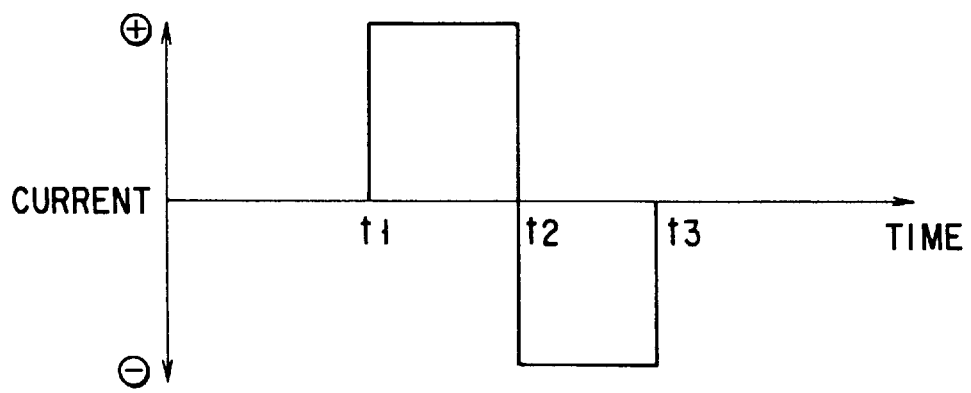
F I G. 12

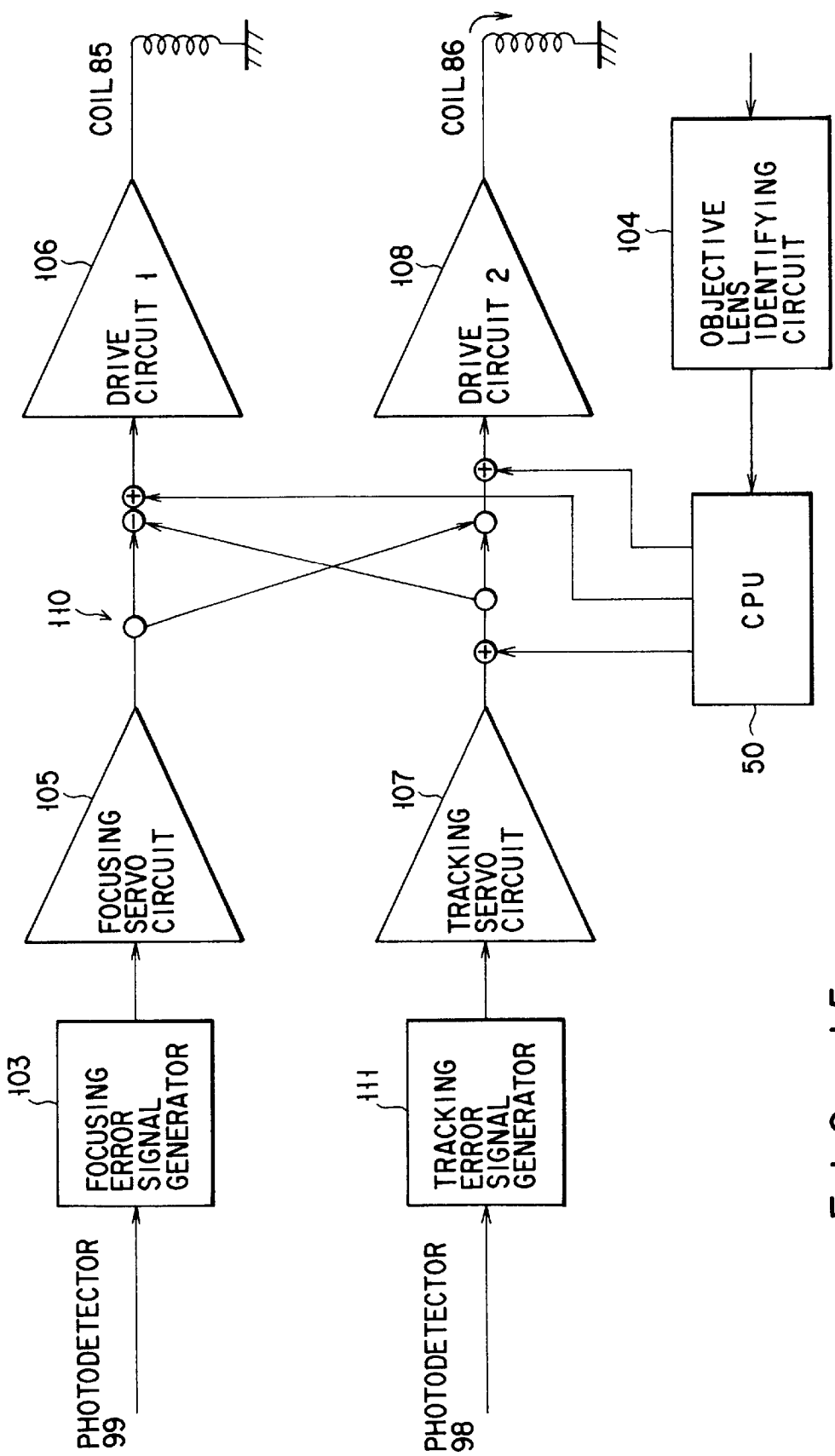
F I G. 15

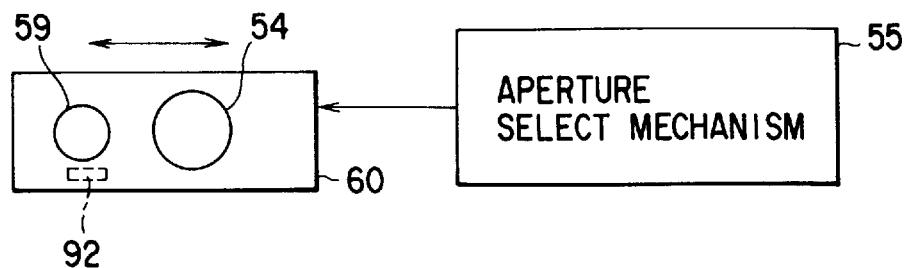
F I G. 16
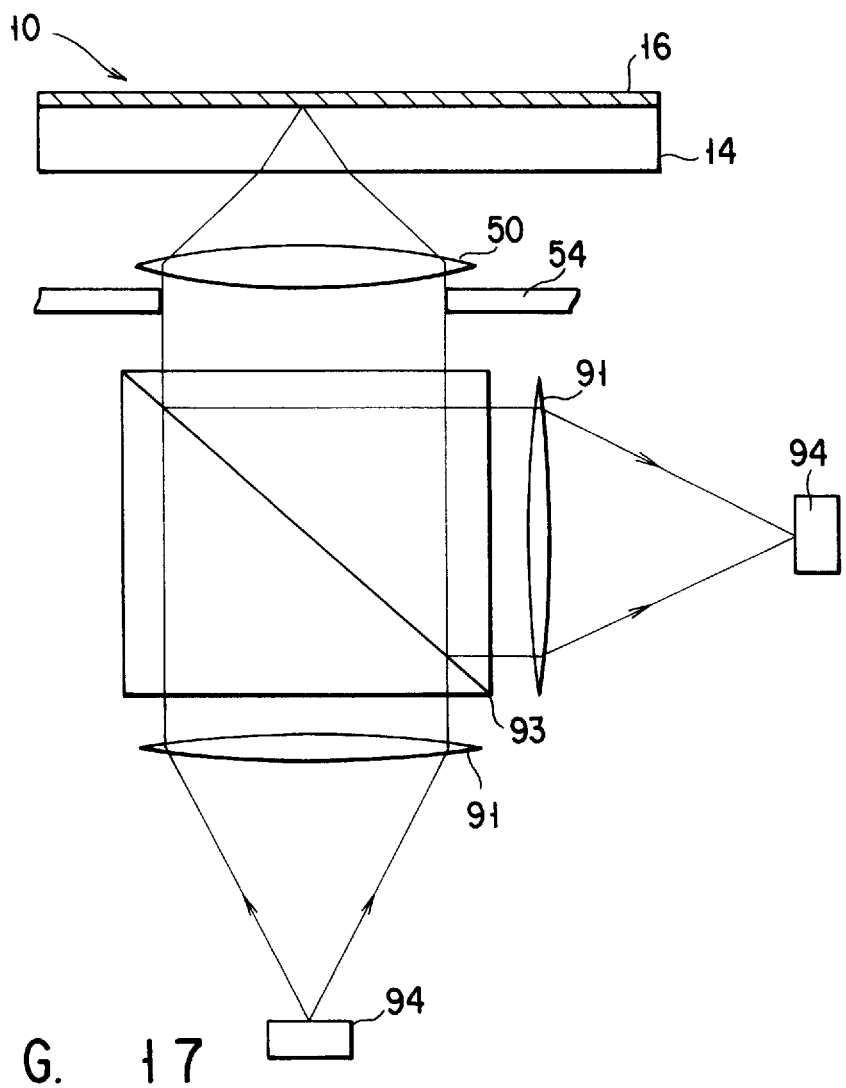
F I G. 17

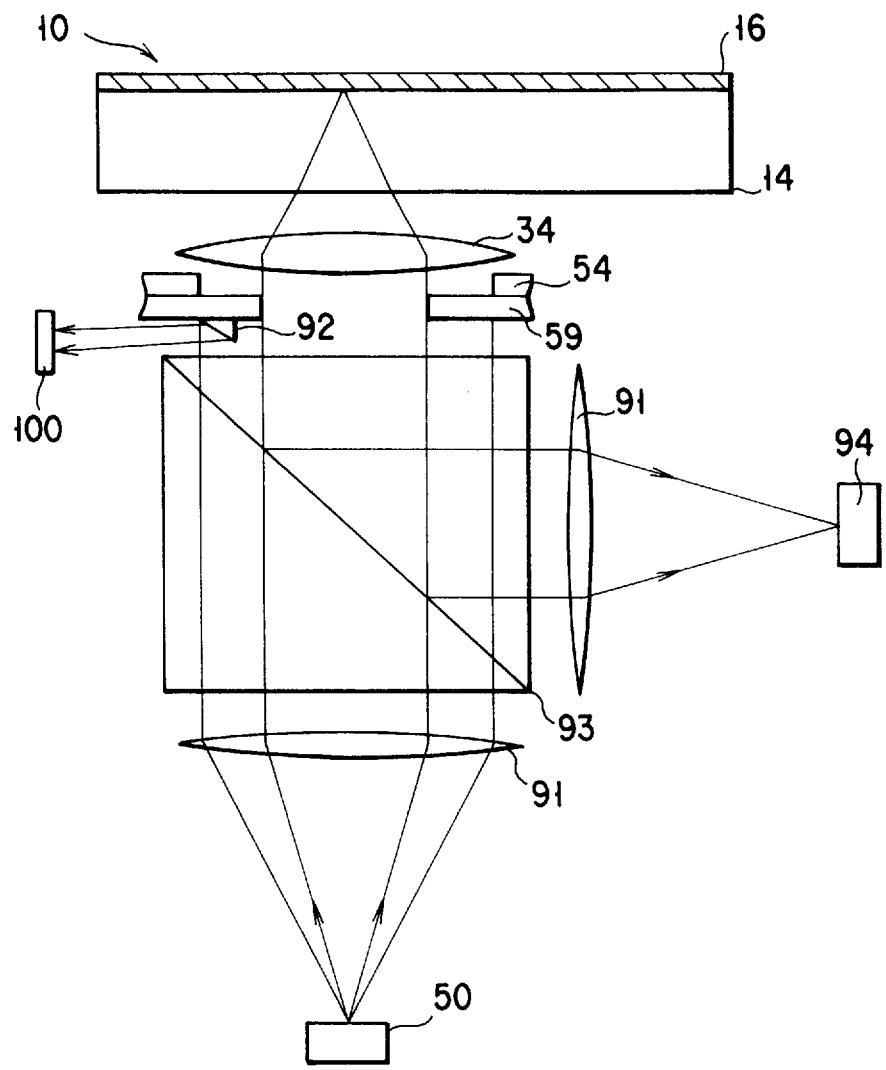
F I G. 18

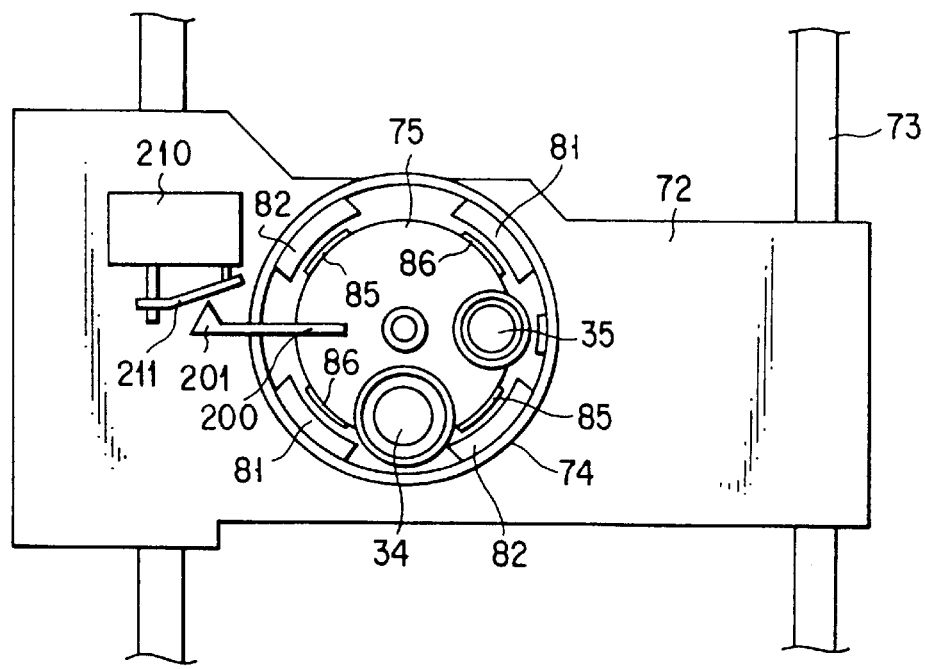
F I G. 19
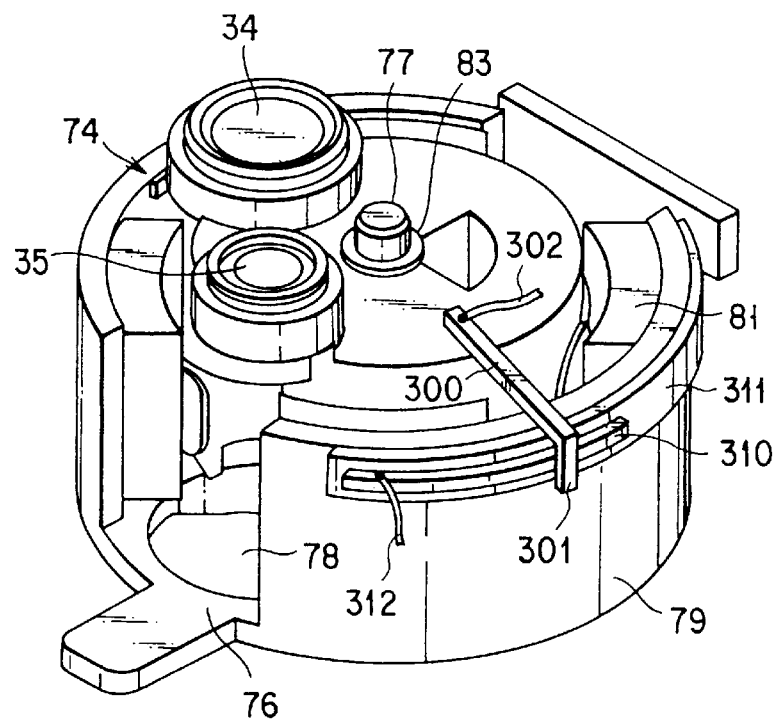
F I G. 20

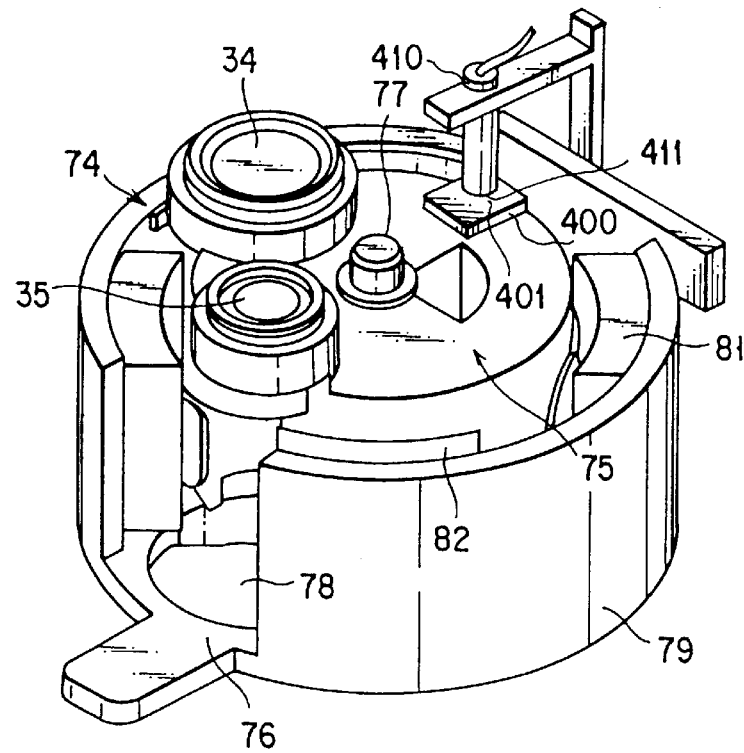
F I G. 21
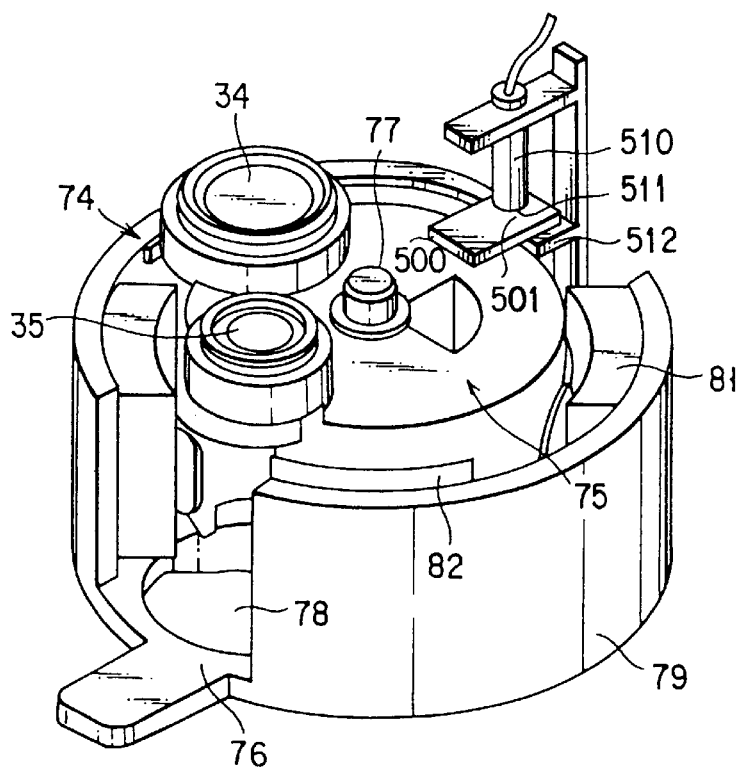
F I G. 22

OBJECTIVE LENS DRIVING APPARATUS

BACKGROUND OF THE INVENTION

1. Field of the Invention

This invention relates to an objective lens driving apparatus provided on an optical disc apparatus, and more particularly to an objective lens driving apparatus that not only switches objective lenses with different numerical apertures according to the type of a recording medium but also identifies the type of the selected objective lens.

2. Description of the Related Art

With the recent development of optical information recording mediums, including optical discs and magneto-optical discs, objective lens driving apparatuses for use with the reproduction systems of those optical information recording mediums are actively being developed. Objective lens driving apparatuses have been widely used as compact disc (CDs) or CD-ROM driving apparatuses.

Recently, objective lens driving apparatuses have been developed for not only reproducing use but also recording use. Well-known recording methods used for those apparatuses are the magneto-optical recording method and the phase-modulation recording method. Many of such recording methods have been prescribed in detail by standards. In recent years, however, a high-density recording optical disc aimed at improvements in the recording density has appeared and the research and development of optical discs of the high-density recording type have been done at a rapid rate. With such optical discs, for high-density recording, pits serving as data recording units are required to be made smaller than those on conventional CDs and the pits are needed to be searched for with high accuracy. An optical disc of the high-density recording type differs from a conventional CD in the thickness of the substrate. For an apparatus for reproducing the optical disc, the wavelength of a laser beam searching for pits is shorter and the numerical aperture of the objective lens is set larger so that the diameter of the beam spot formed on the optical disc may be smaller.

When various modification are made on new discs appearing one after another as described above, it is difficult for apparatuses of the above-described type to record and reproduce the data onto and from optical discs complying with the conventional standards. It is an inconvenience to the users to prepare a disc apparatus according to the recording medium used.

To solve such a problem, a method of providing a plurality of optical heads with different focal lengths on a single optical disc apparatus has been proposed, as disclosed in U.S. Pat. No. 5,235,581. With the disc apparatus, two optical heads are provided so as to enable tracking independently, thereby making it possible to record and reproduce the data onto and from a conventional compact disc, such as a compact disc.

In such a method, two optical heads are positioned so that they may face each other symmetrically with the center of the optical disc and the two optical heads cannot be placed side by side. Therefore, with an optical disc apparatus employing such a method, in the case of an optical disc (e.g., a CD ROM or MO) housed in a cartridge (caddie) with a window section, none of the two objective lenses can be positioned under the opening of the window section with a limited area. As optical disc apparatuses have been popularized, there have been great demands toward lower-cost apparatuses. The need for two optical heads, however, is an obstacle to such demands.

From this viewpoint, it is hoped that an optical head in which two or more objective lenses of different types are provided and which switches the objective lens therein will appear. With this configuration, the development of an optical head with a structure that can identify the type of the selected objective lens is also wanted.

SUMMARY OF THE INVENTION

An object of the present invention is to provide an objective lens driving apparatus which can not only selectively switch between an objective lens of a type capable of recording and reproducing the data onto and from widely used optical information recording mediums and an objective lens of a type capable of recording and reproducing the data onto various types of optical information recording mediums expected to appear in the future, but also identify the type of the objective lens switched and selected.

Another object of the present invention is to provide an objective lens driving apparatus which includes at least two objective lenses with different numerical apertures according to optical information recording mediums conforming to different standards, and has a simple configuration that can not only switch the objective lens according to the optical information recording medium but also identify the type of the objective lens switched and selected.

According to the present invention, there is provided an apparatus for searching a recording medium using a light beam. The apparatus comprises a first objective lens and a second objective lens each having an optical axis. A light beam generator generates a light beam directed along any optical path extending between the light beam generator and the recording medium. A lens holder having a rotational axis supports objective lens and second objective lens. A reflecting element is associated with on the lens holder. The reflecting element is positioned and configured to reflect a part of the light beam generated by the light beam generator and directed along the optical path. The lens holder is movable axially along the rotational axis thereof to thereby move one of the first and second objective lenses axially along its respective optical axis. An objective lens driver is constructed and arranged to rotate the lens holder to thereby select one of the objective lenses by placing the selected objective lens in the optical path of the light beam generated by the light beam generator so that the selected objective lens focuses the light beam on the recording medium. The objective lens driver is constructed and arranged to move the lens holder axially along the optical axis of the selected objective lens to thereby adjust to focusing of the light beam by the selected objective lens and rotate the lens holder to thereby cause the objective lens to track a desired area of the recording medium. An objective lens identifier is constructed and arranged to sense the part of the light beam reflected by the reflecting element and identify with one of the objective lenses has been selected and placed in the optical path of the light beam.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a schematic block diagram of an optical disc apparatus according to an embodiment of the present invention;

FIG. 11 is a perspective view of a magnetic circuit for switching the objective lens in the optical pickup shown in FIG. 5;

FIG. 12 is a waveform diagram of a signal that causes the magnetic circuit of FIG. 11 to switch the objective lens;

FIG. 15 is a block diagram of a circuit that switches the driving system for the optical pickup on the basis of the judging operation of FIGS. 14A and 14B;

FIG. 16 is a schematic plan view of a shutter built in a disc apparatus according to another embodiment of the present invention;

FIGS. 17 and 18 schematically show the optical systems of disc drive units in which the shutter shown in FIG. 16 has been built;

FIG. 19 is a plane view showing modifications of the optical pickup of the objective lens driving apparatus, shown in FIG. 4, which have different sensor mechanisms for sensing the lens position; and FIGS. 20, 21, 22 and 23 are perspective views showing modifications of the optical pickup of the objective lens driving apparatus, shown in FIG. 4, which have different sensor mechanisms for sensing the lens position.

DETAILED DESCRIPTION OF THE PREFERRED EMBODIMENTS

Hereinafter, an optical disc reproducing apparatus provided with an objective lens driving apparatus according to an embodiment of the present invention will be explained by reference to the accompanying drawings.

Figure 2:
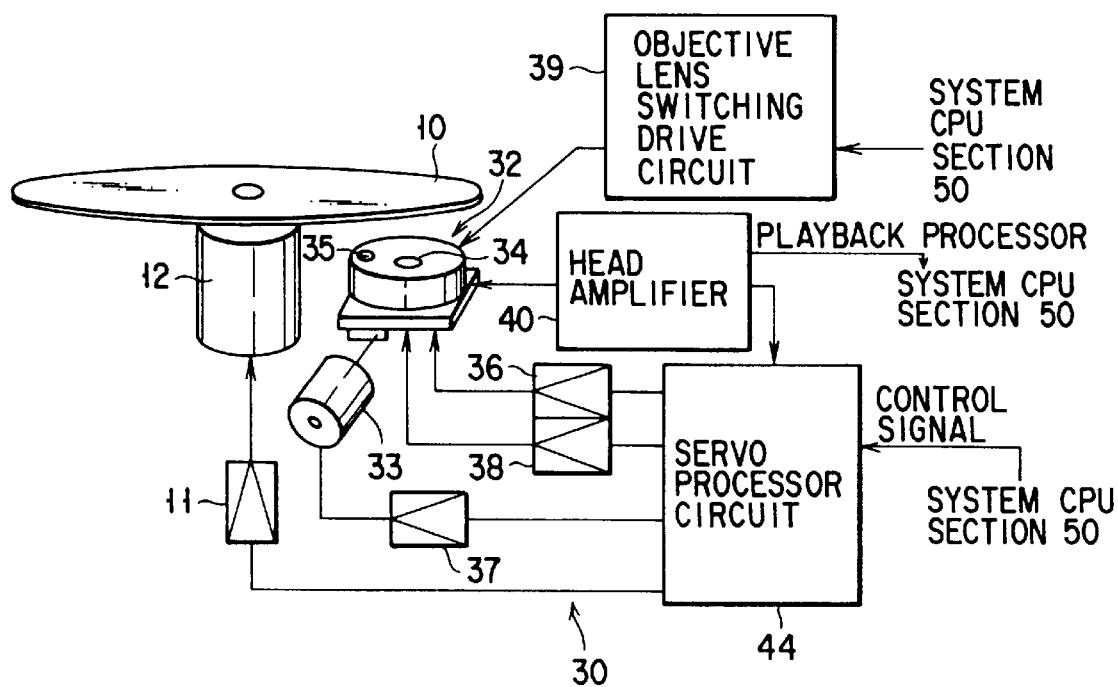
FIG. 2 is a detailed block diagram of the disc drive unit shown in FIG. 1.
Figure 3:
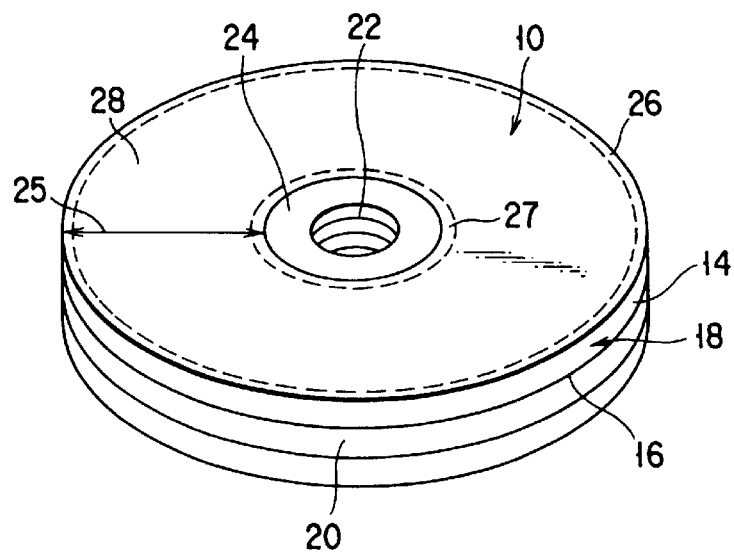
FIG. 3 is a schematic perspective view of the optical disc shown in FIG. 1.

FIG. 1 is a block diagram of an optical disc reproducing apparatus that reproduces the data from an optical disc associated with an embodiment of the present invention. FIG. 2 is a block diagram of the disc drive section that drives the optical disc shown in FIG. 1. FIG. 3 illustrates the structure of the optical disc shown in FIG. 2.

With the optical disc reproducing apparatus of FIG. 1, when the user operates a key control and display section 4, the recording data, that is, the video data, sub-video data, and audio data, is reproduced from the optical disc 10. The reproduced data is converted into a video signal and an audio signal in the apparatus, which are supplied to a monitor section 6 and a speaker section 8, respectively. The monitor section reproduces the image from the video signal and the speaker section reproduces the sound from the audio section.

There have been optical discs 10 with various structures. For instance, one commercially available optical disc of a high-density recording type on which the data has been recorded at a high density is shown in FIG. 3, a recording layer, or a pair of structural members 18 in which a reflecting layer 16 is formed, is provided on a transparent substrate 14, with the pair of structural members 18 being laminated together with an adhesive layer 20 so that the recording layer 16 may be sealed in it. The optical disc 10 thus constructed has a central hole 22 into which the spindle of a spindle motor 12 can be inserted. Around the central hole 22, there is provided a clamping area 24 against which the optical disc 10 is pressed while the disc is rotating.

The area from the clamping area 24 to the outer edge of the optical disc 10 is an information recording area 25 in which information can be recorded on the optical disc 10. The optical disc shown in FIG. 3 has the information area 25 on each side of the disk. For each information recording area 25, its outer periphery area is a lead-out area 26 in which no information is normally recorded and its inner periphery area adjoining the clamping area 24 is a lead-in area 27 in which no information is normally recorded. The area between the lead-out area 26 and the lead-in area 27 is a data recording area 28. At the recording layer 16 in the information recording area 25, tracks are formed in a spiral continuously as an area in which data is to be recorded. The continuous tracks are divided into a plurality of sectors. Data is recorded on the basis of the sectors. The data recording area 28 in the information recording area 25 is an actual data recording area, in which the management data, the main video data, the sub-video data, and the audio data are recorded in the form of physical changes, such as pits. With the read-only optical disk 10, pit trains have been formed by a stamper on the transparent substrate 14. A reflecting layer is formed on the side of the transparent substrate 14 on which the pit trains have been formed by evaporation. The reflecting layer is used as a recording layer 14. In the read-only optical disk 10, grooves are not particularly made and the pit trains are tracks. Usually, such a high-density recording type of optical disc 10 has a transparent substrate 14 with a thickness of 0.6 mm, half of the thickness of the transparent substrate of a conventional optical disc, such as a CD or a CD-ROM, whose transparent substrate has a thickness of 1.2 mm.

With the optical disc 10 is loaded in a disc drive section 30 of the optical disc reproducing apparatus that reproduces the data from the optical disc 10. The disc drive section 30 drives the optical disc and searches the optical disc 10 using a light beam. Specifically, as shown in FIG. 2, the optical disc 10 is placed on a spindle motor 12 driven by a motor driving circuit 11 and is rotated by the spindle motor 12. Under the optical disc 10, an optical head, or an optical pickup 32, that focuses the light beam, or the laser beam, on the optical disc 10 is provided. The optical pickup 32, which will be explained in detail later, includes an objective lens 35 with a small numerical aperture for CD or CD-ROM and an objective lens 34 with a large numerical aperture for a high-density recording type of optical disc explained in FIG. 3. The optical pickup further includes an objective lens switching circuit 39 that generates a driving signal for switching between the objective lenses 34 and 35. When the type of the optical disc 10 to be searched, that is, whether the optical disc is of a conventional CD type or a high-density recording type, is determined, the objective lens switching circuit 39 operates to generate a driving signal. By the driving signal from the objective lens switching circuit 39, one of the objective lenses 34 and 35 is selected according to the determined type of optical disc 10 and is placed in the laser beam optical path.

The optical head 32 is placed on a guide mechanism so as to be able to move radially along the optical disc 10 to search for the information recording area, particularly the data recording area 28, and is moved radially along the optical disc 10 by a feed motor 33 driven by the driving signal from a driving circuit 37. In the optical disc apparatus, the objective lenses 34, 35 are supported in a manner to allow movement along their optical axes and are moved along their optical axes in response to the driving signal from a focus driving circuit 36 so that the objective lenses 34, 35 is always in focus, thereby forming a very small beam spot on the recording layer 16. Furthermore, as explained in detail later, the objective lenses 34, 35 are supported so as to move minutely along the radius of the optical disc 10 and are moved minutely in response to the driving signal from a track driving circuit 38 so as to be always kept in the tracking state, thereby causing the light beam to trace the tracks on the recording layer 16 of the optical disc 10.

The optical head 32 senses the light beam reflected by the optical disc 10 and supplies the sense signal to a servo processing circuit 44 via a head amplifier 40. The servo processing circuit 44 generates a focus signal, a tracking signal, and a motor control signal from the sense signal and supplies these signals to the focus driving circuit 36, track driving circuit 38, and motor driving circuit 11, respectively. As a result, the objective lenses 34, 35 are kept in the in-focus state and in the tracking state. Furthermore, the spindle motor 12 is rotated at a specific number of revolutions and the light beam traces a track on the recording layer 16 at, for example, a constant linear speed. When a system CPU section 50 supplies a control signal, or an access signal, to the servo processing circuit 44, the servo processing circuit 44 supplies a move signal to the driving circuit 37 and the optical head 32 is moved radially with respect to the optical disc 10 and accesses a specific sector on the recording layer 16. The reproduced data is amplified by the head amplifier 40. The amplified signal is outputted from the disc drive section 30.

The outputted reproduced data is stored in a data RAM section 56 via the system CPU section and a system processor section 54 which are controlled by the programs stored in a system ROM and RAM section 52. The stored reproduced data is processed by the system processor section 54, which classifies the data into video data, audio data, and sub-video data. The video data, audio data, and sub-video data are supplied to a video decoder section 58, an audio decoder section 60, and a sub-video decoder section 62, respectively, which decode the respective data. The decoded video data, audio data, and sub-video data are converted by a D/A and reproducing circuit 64 into an analog video signal, analog audio signal, and analog sub-video signal. The D/A and reproducing circuit also performs a mixing process on the decoded video data, audio data, and sub-video data and supplies a video signal and a sub-video signal to the monitor 6 and an audio signal to the speaker 8. As a result, the monitor section 6 displays the image and the speaker section reproduces the sound.

The details of the optical pickup 32 of FIG. 2 and its guide mechanism will be described by reference to FIGS. 4 to 11.

Figure 4:
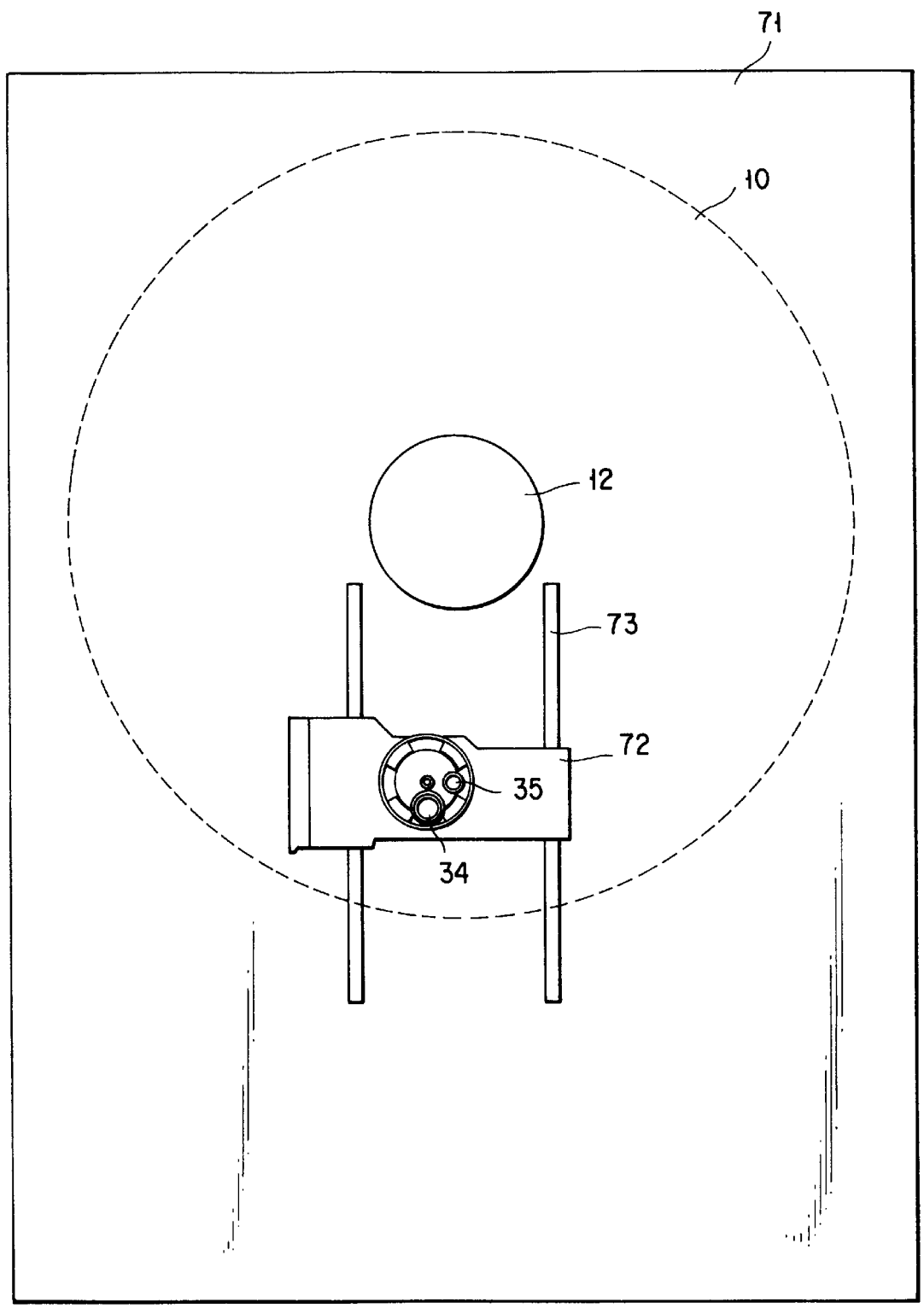
FIG. 4 is a plan view of an objective lens driving apparatus that switches and drives the objective lens shown in FIG. 2.

The spindle motor 3 is fixed to a base 71 as shown in FIG. 4. The optical disc 10 rotated by the spindle motor 3 is held by chuck means (not shown). Under the optical disc 10, a pair of guide rails 73 placed radially parallel to the disc is secured to the base 71. On the guide rails 73, a carriage 72 that moves along the guide rails 73 is placed. An objective lens actuator shown in FIG. 5 is provided on the carriage 72.

Figure 5:
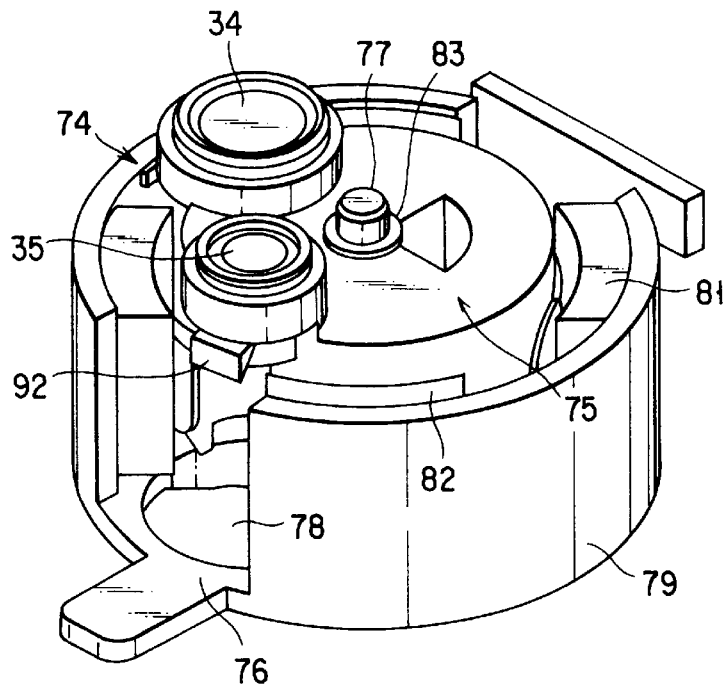
FIG. 5 is a perspective view of the optical pickup of the objective lens driving apparatus shown in FIG. 4.
Figure 6:
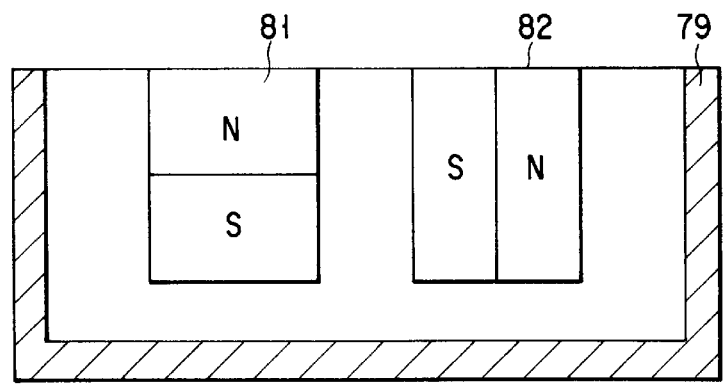
FIG. 6 is a sectional view of the internal structure of the lens holder support of the optical pickup shown in FIG. 5.

The objective lens actuator shown in FIG. 5 is composed of a lens holder 75 capable of floating and rotating and a lens holder support 74 in which the lens holder 75 is housed. An actuator base 76 that is fixed to the carriage 72 and has an opening section 78 for a laser beam optical path is provided on the lens holder support 74. In the central portion of the actuator base 76, a shaft 77 is secured. In the support 74, an arc-shaped yoke 79 is secured to the actuator base 76 along the circumference around the shaft 77. In the arc-shaped yoke 79, two pairs of arc-shaped permanent magnets 81, 82 are placed symmetrically around the shaft 77, with a set of magnets facing each other being magnetized in the same direction. One set of permanent magnets 81 is magnetized so that the north (N) pole and the south (S) pole may be arranged along the shaft 77 as shown in FIG. 6. The other set of permanent magnets 82 is magnetized along the arc of the circular arc of the arc-shaped yoke 79 as shown in FIG. 6.

Figure 7:
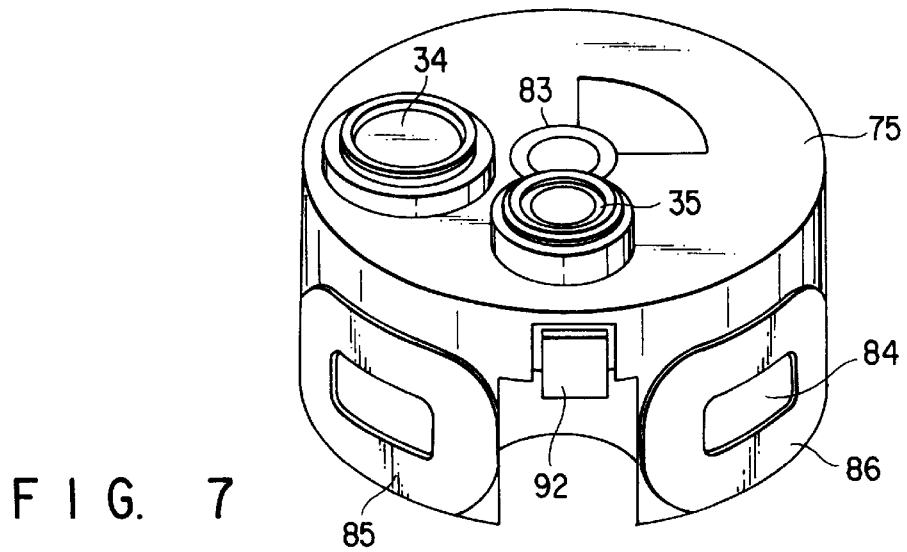
FIG. 7 is a perspective view of the lens holder of the optical pickup shown in FIG. 5.

The lens holder 75 is formed into a roughly circular cylinder as shown in FIG. 7. On the top surface of the lens holder, the objective lens 35 for CD or the like and the objective lens 34 for a high-density recording type are provided. Under the objective lenses 34, 35, a cavity is provided so as to allow laser beams to pass through. The objective lenses 34, 35 are fixed to the lens holder 75 so that their optical axes may be located on the same circumference around the center of the lens holder 75. In the center of the lens holder 75, bearings 83 into which the shaft 77 is inserted are fixed. The bearings 83 enables the shaft 77 to support the lens holder 75 so that the holder may rotate and make an up-and-down movement. Around the lens holder 75, magnetic materials 84 are embedded symmetrically with respect to the shaft 77. On the magnetic materials 84, four magnetic coils 85, 86 are secured and arranged symmetrically with respect to the shaft 77.

Figure 8:
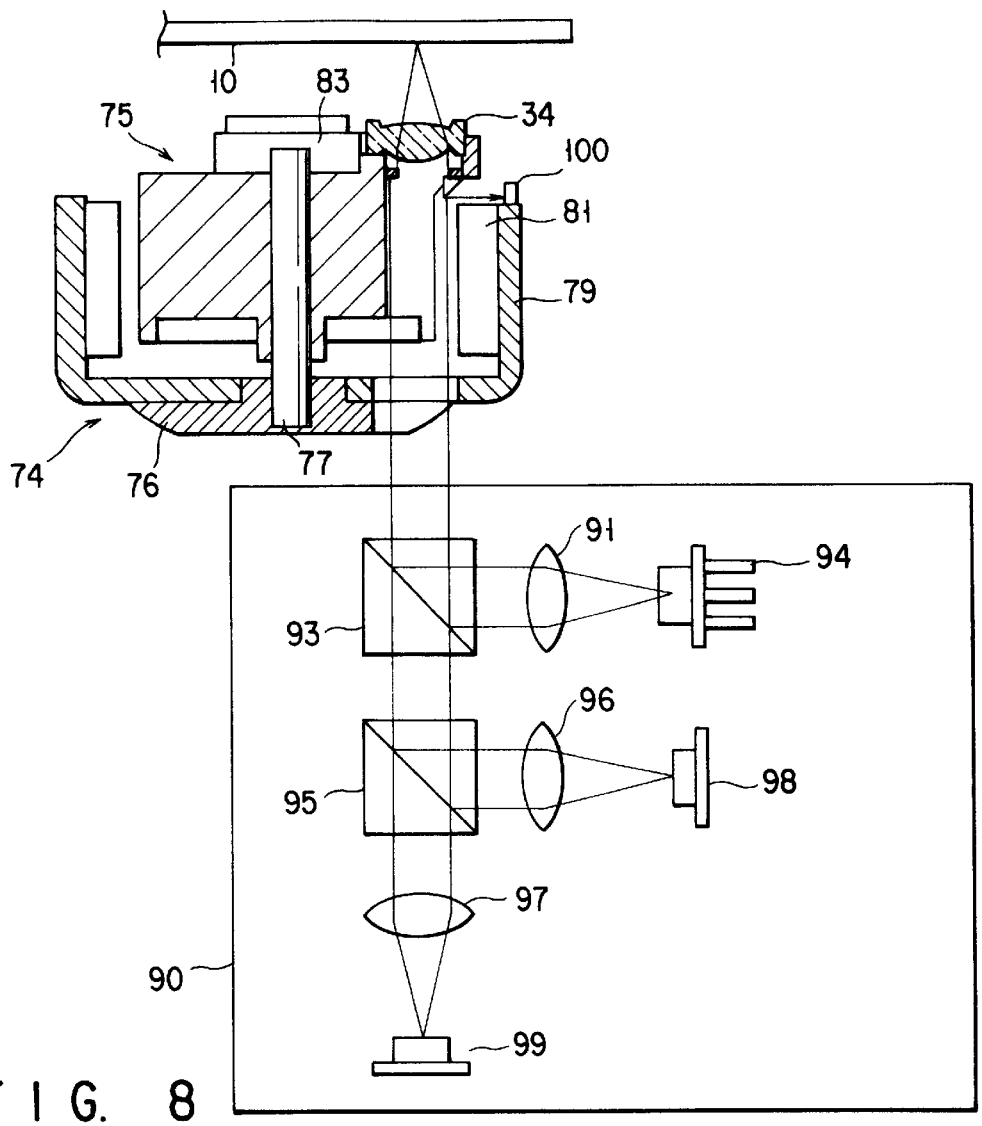
FIG. 8 schematically shows the optical pickup of FIG. 5 and an optical system related to the optical pickup.
Figure 9:
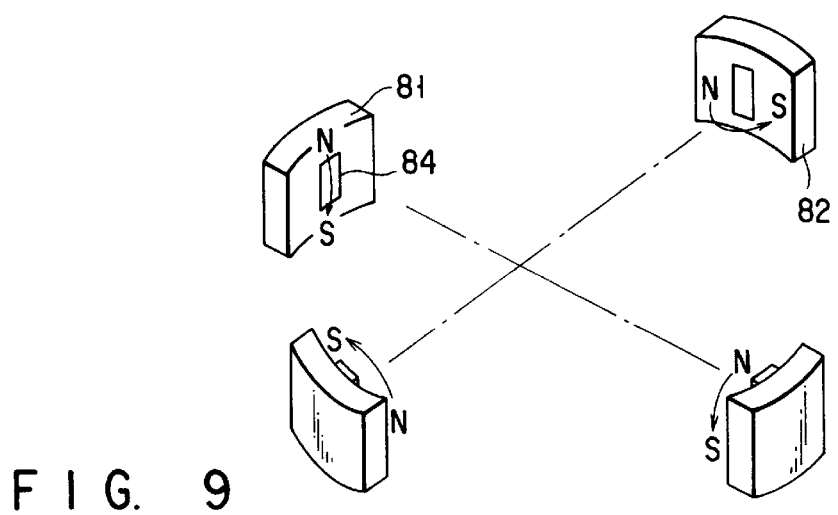
FIG. 9 is a conceptual diagram to help explain the principle of floating the lens holder magnetically in the optical pickup shown in FIG. 5.

At the side of the lens holder 75 near the objective 35, a reflecting element 92, for example, a reflecting mirror or a reflecting prism, is provided as shown in FIG. 7. The reflecting element 92 is positioned in the optical path of the laser beam so that part of the laser beam heading for the objective lens 35 may enter the reflecting element. As shown in FIG. 8, a sensor 100 that senses part of the light beam reflected by the reflecting element 92 is provided in the lens holder support 74. When one of the objective lenses 34, 35 is selected and the reflecting element 92 is positioned in the laser beam optical path as described later, part of the laser beam is reflected by the reflecting lens 92 and is sensed by the sensor 100. Aperture stops that limit the laser beam entering the objective lenses 34, 35 are usually provided on the light source side of the objective lenses 34, 35. The reflecting element 92 is placed on the light source of the aperture stops so as to reflect part of the laser beam that should have been limited by the aperture stops. From the viewpoint of placing the reflecting element 92 so as to reflect part of the laser that should have been limited by the aperture stops, it is desirable that the reflecting element 92 should be provided on the side of the lens holder 75 near the objective lens 35 with the small aperture for reproducing a CD or the like in terms of space. The reflecting element is not limited to a separate element. For instance, it may be such that part of the lens holder 75 is formed at a reflecting surface or that part of the aperture stop is formed into a reflecting surface.

The optical pickup 32 and an optical unit 90 of the optical system related to the optical pickup 32 are shown in FIG. 8. The optical unit 9 including a semiconductor laser 94 that generates a laser beam focused on the optical disc 10 is housed and secured in the internal space of the carriage 72, a movable body. The laser beam generated by the semiconductor laser 94 in the optical unit 90 is collimated by the collimator lens 91. The collimated beam is reflected by a beam splitter 93 and the resulting beam is directed outside the optical unit 90. The laser beam from the optical unit 90 is directed to either objective lens 34 or objective lens 35 in the optical pickup 32 fixed on the carriage 72. Either objective lens 34 or objective lens 35 focuses the laser beam on a recording track on the optical disc 10. The laser beam reflected by the optical disc 10 passes through one of the objective lenses 34, 35 again and is returned to the optical unit 90. In the optical unit 90, the laser beam passes through the beam splitter 93 and is separated by a beam splitter 95 into two sub-beams. The respective beams are gathered by condenser lenses 96, 97. These condensed beams are sensed by a first photodetector 98 and a second photodetector 99 provided in the optical unit 5. Using the sense signals from the photodetectors 98, 99, an information signal, focus error signal, track error signal, etc. are generated as described earlier. Use of the focus error signal enables the positional error of the selected one of the objective lenses 34, 35 in the focus direction to be sensed. To correct the positional error, current is supplied to one of the coils 85, 86 as explained later. In addition, use of the track error signal enables the positional error of the objective lenses 34, 35 in the track direction to be sensed. Current is supplied to the other of the coils 85, 86 so as to correct the positional error. In this way, the information is recorded onto a recording track on the optical disc 10 and the information is read from the recording track on the optical disc 19.

The details of the operation of the optical pickup 32 will be explained.

Figure 10A:
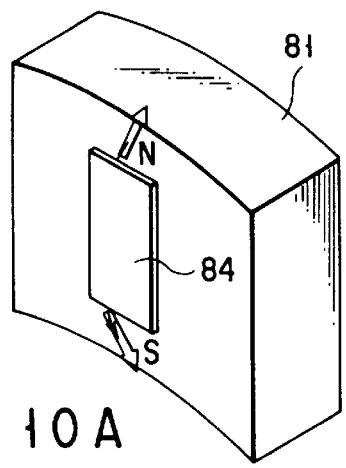
FIGS. 10A to 10F are perspectives view to help explain the principle of floating the lens holder magnetically in the arrangement of FIG. 9.
Figure 10B:
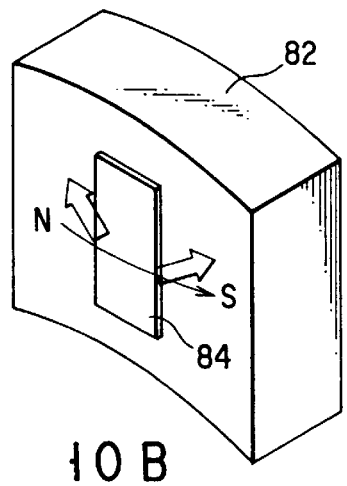
Figure 10C:
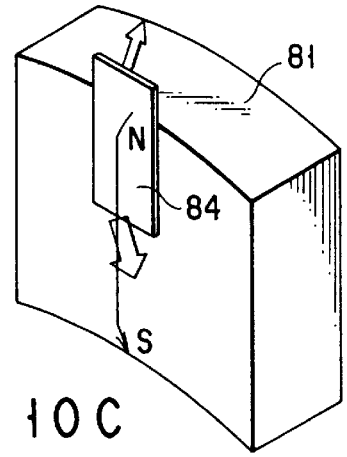
Figure 10D:
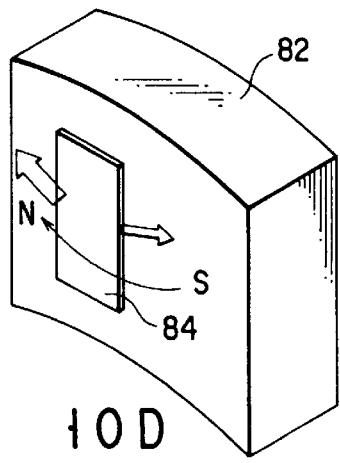
Figure 10E:
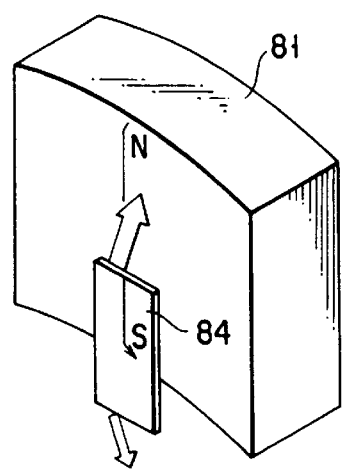
Figure 10F:
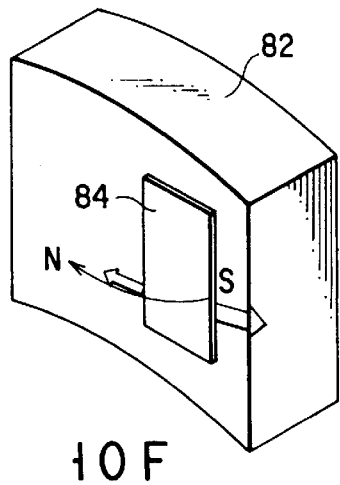

First, the reason why the lens holder 75 is floated magnetically by what is called a magnetic spring within the lens holder support 74. As described earlier, in the lens holder 74, two pairs of permanent magnets 81, 82 are arranged symmetrically around the shaft 77 of the lens holder support 74. On each of the permanent magnets 81, 82, magnetic materials 84 are placed so as to face each other with a gap between them. Specifically, the magnetic materials 84 are arranged symmetrically around the shaft 77 and are secured to the lens holder 75. Consequently, the magnetic materials 84 are attracted by the permanent magnets 81, 82 in such a manner that the permanent magnets 81, 82 and magnetic materials 84 are kept in a neutral position or in a stable state, as shown in FIGS. 10A and 10B. As a result, the lens holder 75 is floated magnetically within the lens holder support 74. In this situation, when disturbance is given to the lens holder 75 and the magnetic material 84 has deviated upward from the neutral position as shown in FIG. 10C, the downward force to put the magnetic material 84 back to the neutral position greater than the upward force is exerted on the magnetic material 84, so that the magnetic material 84 is returned to the neutral position. Similarly, when the lens holder 75 is disturbed and the magnetic material 84 has deviated downward from the neutral position as shown in FIG. 10E, the upward force to put the magnetic material 84 back to the neutral position greater than the downward force is exerted on the magnetic material 84, so that the magnetic material 84 is returned to the neutral position. Furthermore, when the lens holder 75 is disturbed and the magnetic material 84 has deflected rightward along the circumference from the neutral position as shown in FIG. 10D, the leftward force to put the magnetic material 84 back to the neutral position greater than the rightward force is exerted on the magnetic material 84, so that the magnetic material 84 is returned to the neutral position. Similarly, when the lens holder 75 is disturbed and the magnetic material 84 has deflected leftward along the circumference from the neutral position as shown in FIG. 10F, the rightward force to put the magnetic material 84 back to the neutral position greater than the leftward force is exerted on the magnetic material 84, so that the magnetic material 84 is returned to the neutral position.

The magnetic materials 84 are arranged in axisymmetric positions. When the lens holder 85 is rotated and the objective lens is switched as explained later, magnetic attraction causes the position of the first objective lens 34 in the neutral position to coincide with the neutral position of the second objective lens 35, so that the second objective lens 35 can be used in the state where the optical unit 90 and the first objective lens 34 have been adjusted.

Figure 13A:
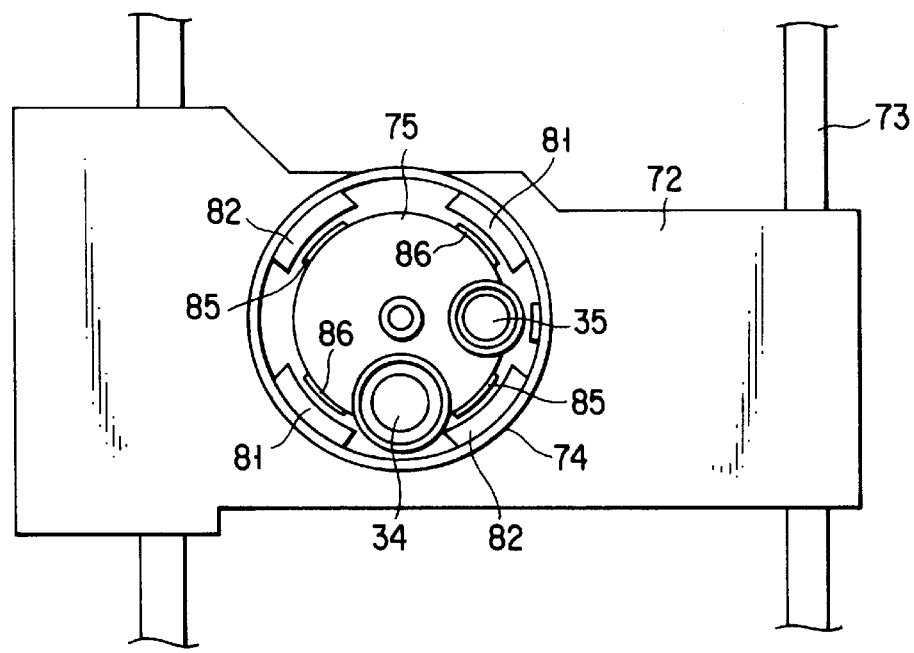
FIGS. 13A and 13B are plan views to help explain the objective lens switching operation by the objective lens driving apparatus.

Now, the switching operation for selecting either objective lens 34 or objective lens 35 will be explained. With the objective lens 34 with the large numerical aperture being put in the optical path of the laser beam as shown in FIG. 7 and FIG. 13A, the coil 85 is assumed to face the permanent magnet 82 magnetized in the circumferential direction and the coil 86 is assumed to face the permanent magnet 81 magnetized in the axial direction. This state corresponds to the neutral state already described in which the lens holder 75 is kept in place stably. In the stable state, when a positive current as shown by arrow P0 is supplied to the coil 85 at time t1 as shown in FIG. 12, the axial direction portions 85A, 85B of the coil 85 parallel to the axis 77 are supplied with a current interacting with a magnetic field produced by the permanent magnet 82, which produces force FR that generates torque in the circumferential direction, thereby causing the lens holder 75 to start to rotate. During the interval between time t1 to time t2, starting force that rotates the lens holder 75 sufficiently is exerted on the coil 85. At time t2 that the coil 85 has begun to rotate and the coil portion 85B on the outgoing side of the coil 85 faces the south (S) pole of the permanent magnet 82, the current supplied to the coil 85 is inverted as shown in FIG. 12. The inversion produces torque FR that moves the coil 85 away from the permanent magnet 82 between the coil portion 85B on the outgoing side of the coil 85 and the S pole of the permanent magnet 82. The torque is applied to the coil 86. As a result, the coil 86 is rotated toward the front side of the permanent magnet 81. At time t3 in the course of rotation, the supply of current to the coil 86 is stopped. After time t3, the lens holder 75 rotates under its inertia. Although the coil 86 passes the neutral point of the permanent magnet 81 temporarily, the coils 85, 86 are returned to the stable neutral position according to the principle explained in FIGS. 10A to 10F. In this way, the rotation of the lens holder 75 causes the coil 86 to face the permanent magnet 82 and the coil 85 to face the permanent magnet 81 and places the objective lens 35 with the small numerical aperture in the optical path of the laser beam in place of the objective lens 34 with the large numerical aperture, which virtually switches the objective lens.

In a case where the lens holder 75 is rotated and the objective lenses 34, 35 are thereby switched, when the clearance between the rotating shaft 77 and the bearings 83 is set at 10 microns or less, the installation position error between the first objective lens 34 and the second objective lens can be ignored.

Now, the focusing operation and tracking operation of the optical pickup 32 of FIG. 5 will be explained.

With the objective lens 34 with the large numerical aperture being put in the optical path of the laser beam as shown in FIG. 7 and FIG. 13A, the coil 86 facing the permanent magnet 81 magnetized in the axial direction for focus control acts as a focus control coil and the coil 85 facing the permanent 82 magnetized along the circumference for tracking control acts as a tracking control coil. Specifically, when a focus coil driving current Fi is supplied to the coil 86 in response to the focus error signal, the circumferential direction portions 86A, 86B of the coil 86 interact with a magnetic field produced by the permanent magnet 81, which causes upward or downward force to act on the coil 86 according to the direction of the current Fi, thereby moving the lens holder 75 upward or downward along the axial direction and keeping the objective lens 34 in the in-focus state. When a tracking coil driving current Ti is supplied to the coil 85 in response to the tracking error signal, the axial direction portions 85A, 85B of the coil 85 interact with a magnetic field produced by the permanent magnet 82, which causes rightward or leftward force to act on the coil 85 according to the direction of the current Ti, thereby rotating the lens holder 75 in the circumferential direction and keeping the objective lens 34 in the on-track state.

Figure 13B:
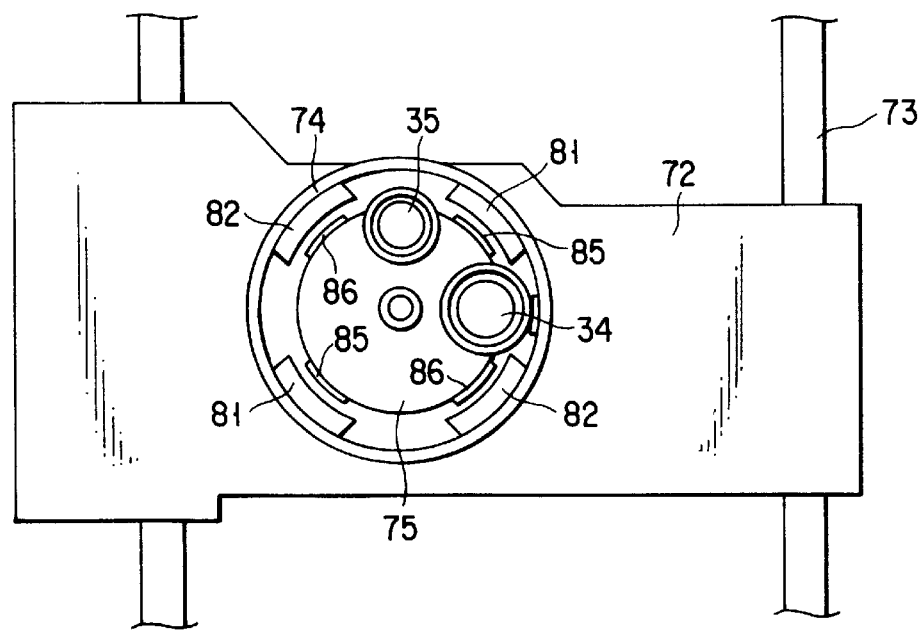

As explained earlier, after switching to the objective lens 35, the objective lens 35 with the small numerical aperture is put in the optical path of the laser beam as shown in FIG. 13B. In this state, the coil 85 facing the permanent magnet 81 magnetized in the axial direction for focus control acts as a focus control coil and the coil 86 facing the permanent 82 magnetized along the circumference for tracking control acts as a tracking control coil. Specifically, when a focus coil driving current Fi is supplied to the coil 85 in response to the focus error signal, the circumferential direction portions 85C, 86D of the coil 85 interact with a magnetic field produced by the permanent magnet 81, which causes upward or downward force to act on the coil 85 according to the direction of the current Fi, thereby moving the lens holder 75 upward or downward along the axial direction and keeping the objective lens 34 in the in-focus state. When a tracking coil driving current Ti is supplied to the coil 86 in response to the tracking error signal, the axial direction portions 86C, 86D of the coil 86 interact with a magnetic field produced by the permanent magnet 82, which causes rightward or leftward force to act on the coil 86 according to the direction of the current Ti, thereby rotating the lens holder 75 in the circumferential direction and keeping the objective lens 34 in the on-track state.

As described above, with the objective lens driving apparatus of the present invention, the coils that perform a tracking operation without externally applied force switches objective lens 34 to objective lens 35 or vice versa, there is no possibility that excessive force will act on the objective lenses and incline their optical axes, enabling the reproduction of a stable signal. When the coils 81, 82 switch between the objective lenses 34, 35, this changes the role of the objective lens from tracking operation to focusing operation or vice versa, resulting in not only the improved utilization of the coils but also the improved driving sensitivity.

Since the objective lenses 34, 35 switched by the same coil are for either tracking operation or focusing operation, depending on the situation, it is possible to verify which objective lens is in use without an additional sensing device by forcing current to flow through either coil 81 or coil 32 and sensing the direction of movement of the objective lenses 34, 35. The verifying operation will be explained by reference to FIGS. 14A and 14B.

Figure 14A:
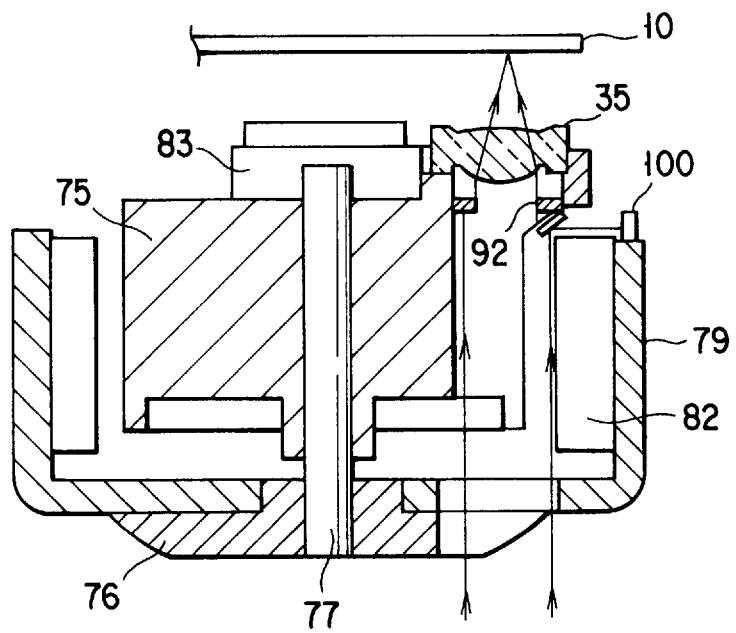
FIGS. 14A and 14B are sectional views to help explain the operation of judging whether or not which objective lens is located in the laser optical path in the optical pickup shown in FIG. 5.
Figure 14B:
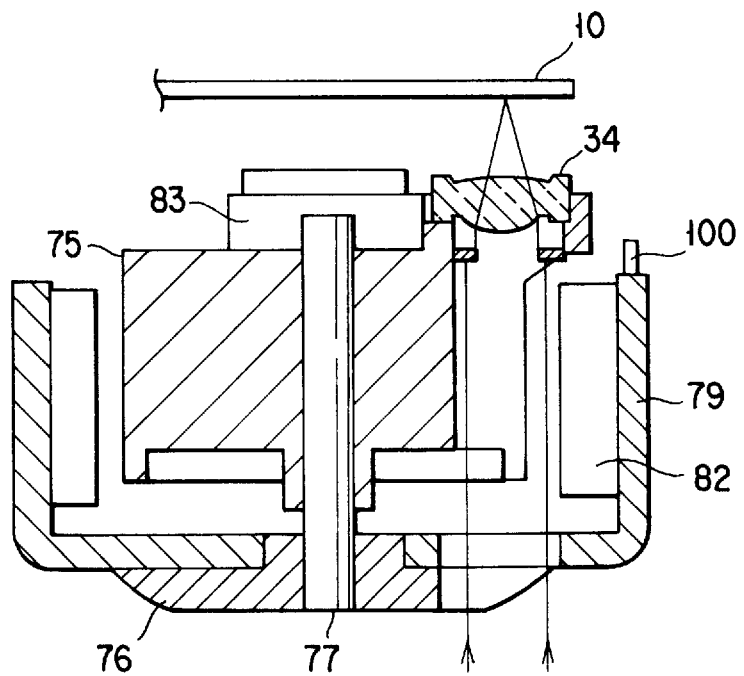

FIGS. 14A and 14B show the relationship between the reflecting element 92 and the sensor 100 which judges which objective lens is placed in the laser optical path in the optical pickup of FIG. 5. As shown in FIGS. 5, 7, and 8, the reflecting element 92 is assumed to be positioned near the objective lens 35 with the small aperture. As shown in FIG. 14A, when the lens holder 75 is rotated and the objective lens 35 is put in the optical path of the laser beam, part of the laser beam is reflected by the reflecting element 92. The reflected part of the laser beam is sensed by the sensor 100. When the sensor 100 outputs a sense signal, it is judged that the CD objective lens 35 with the small aperture is in the effective state and the CD objective lens 35 is in the laser beam optical path. In contrast, as shown in FIG. 14B, when the objective lens 34 with the large aperture for high-density recording optical discs is positioned in the optical path of the laser beam, part of the laser beam is not reflected toward the sensor 100 because the reflecting element 92 is not provided near the objective lens 34, so that the laser beam is not sensed by the sensor 100. Accordingly, the sensor 100 does not output a sense signal, from which it is judged that the objective lens 34 with the larger aperture for high-density recording optical discs is in the effective state and the objective lens 34 for high-density recording discs is in the laser beam optical path.

FIG. 15 is a block diagram of a circuit that switches the drive circuit according to the objective lens switching signal. In the circuit shown in FIG. 15, an objective lens identifying circuit 104 that generates an identification signal for identifying the types of the objective lenses 34, 35 according to the presence or absence of the sense signal from the sensor 100 is connected to the sensor 100 and the identification signal from the objective lens identifying circuit 104 is inputted to the CPU 50 as the need arises. When the objective lens identifying circuit 104 supplies the identification signal to the system CPU section 50, the identification signal is compared with the medium type identification signal from the key operation and display section 4. The medium type identification signal indicates whether the medium to be loaded is an optical disc of the high density type or an ordinary optical disc, such as a CD. When the type of the medium coincides with the type of the objective lens, the reproducing operation is started. When they do not coincide with each other, the objective lens switching signal of FIG. 12 is generated, the type of objective lens is switched.

In the circuit of FIG. 15, a focus error signal generator circuit 103, a focus servo circuit 105, one of coils 85 and 86, and one of driving circuits 106 and 108 corresponding to the coil constitute a focus servo loop. A tracking error signal generator circuit 111, a track servo circuit 107, one of coils 85 and 86, and one of driving circuits 106 and 108 corresponding to the coil constitute a tracking servo loop. In the circuit of FIG. 15, a servo loop switching circuit 110 is provided between the focus servo circuit 105 and track servo circuit 107 and between the driving circuit 106 and driving circuit 108. In response to the identification signal from the objective lens identifying circuit 104 that identifies the types of the objective lenses 34, 35 as described earlier, the servo loop switching circuit 110 switches the connection so that the CPU 50 may form a suitable servo loop. Specifically, when the coil 85 functions as a focus coil, the signal from the CPU 50 activates the servo loop switching circuit 110, which connects the driving circuit 106 connected to the coil 85 to the focus servo circuit 105 and the driving circuit 108 connected to the coil 86 to the tracking servo circuit 107. Similarly, when the coil 85 functions as a tracking coil, the signal from the CPU 50 activates the servo loop switching circuit 110, which connects the driving circuit 106 connected to the coil 85 to the tracking servo circuit 107 and the driving circuit 108 connected to the coil 86 to the focusing servo circuit 108.

In the objective lens switching and driving apparatuses, if the number of objective lenses is n, it is desirable that a 2n number of permanent magnets and a 2n number of coils should be arranged circumferentially to form a magnetic circuit. In this arrangement, the coils and permanent magnets facing each other form a magnetic circuit for focusing and tracking control, which exerts equal force on the lens holder in focusing control and tracking control, enabling the lens holder to be driven in a well-balanced manner with high accuracy. That is, not only the vibration characteristic but also the driving characteristic are improved.

As explained until now, according to the present invention, in an objective lens driving apparatus where objective lenses of different types are fixed to a lens holder and the lens holder is rotated for selection of an objective lens, a reflecting element that reflects part of the laser beam heading for one objective lens is provided on the lens holder near the objective lens and a sensor that senses the presence or absence of the reflected light beam from the reflecting element is provided. This enables the type of the objective lens put in the laser optical path to be identified easily according to the presence or absence of the sense signal from the sensor. According to the identification result, the optical pickup is controlled suitably.

While in the above embodiment, the objective lens 34 is switched to the objective lens 35 or vice versa, the present invention may be applied to a system that projects a laser beam on the optical disc 10 with the optimum numerical aperture obtained by combining a common objective lens 34 with a large diameter with apertures 54 and 59. Specifically, the invention may be applied to an apparatus as shown in FIG. 16 where a shutter 60 having a small aperture 59 and a large aperture 54 is prepared and the shutter 60 is inserted between the beam splitter 93 and the objective lens 34 as shown in FIGS. 17 and 18. In this apparatus, the reflecting mirror 92 is fixed on the shutter 60 near the small aperture 59.

With such an apparatus, the aperture selecting mechanism 55 moves the shutter 60 and the large aperture 54 is selected, the optical sensor 100 does not sense the light beam because the reflecting mirror 92 is not in the optical path of the light beam heading for the aperture 54 as shown in FIG. 17. Therefore, the sensor 100 does not generate a sense signal, from which it is judged that the objective lens 34 with the large aperture for high-density recording optical discs is in the effective state and that the objective lens 34 with the numerical aperture for high density optical discs is in the laser beam optical path. In contrast, when the aperture selecting mechanism 55 moves the shutter 60 and the small aperture 59 is selected, the reflecting mirror 92 is put in the optical path of the light beam heading for the aperture 59 as shown in FIG. 19, so that the reflecting mirror 92 reflects part of the light beam toward the optical sensor 100. Therefore, the sensor 100 generates a sense signal, from which it is judged that the objective lens 34 with the small aperture for CDs is in the effective state and that the objective lens 34 with the numerical aperture for CDs is in the laser beam optical path.

As described above, the reflecting element that reflects part of the laser beam heading for the objective lens is provided on the shutter and the sensor that senses the presence or absence of the reflected light beam from the reflecting element is provided. This makes it possible to easily identify the effective aperture of the objective lens put in the laser optical path according to the presence or absence of the sense signal from the sensor. According to the identification result, the optical pickup is controlled suitably.

In the above embodiment, part of the laser beam heading for the objective is sensed to judge the type of the objective. The present invention is not restricted to the optical sensing means, and may be applied to other sensing means that identify the type of the objective. Hereinafter, various examples of sensing means will be explained as other embodiments of the present invention.

In FIG. 19, a mechanical switch is employed as a sensing mechanism that senses the lens position. Specifically, as shown in FIG. 19, on the top surface of a lens holder 75, a stylus 200 made of silicone rubber is provided, for example. The tip 201 of the stylus 200 is such that when one of the objectives 34 and 35 has been selected, the tip comes into contact with and presses the leaf spring 211 of a micro switch 210 that is located outside the lens holder 75 and has the function of a contact position sensor. When the other objective has been selected, the tip 201 of the stylus 200 does not come into contact with the leaf spring 211, which is thus left open.

In the embodiment of FIG. 19, the stylus 200 is positioned on a diagonal extending from the objective 35 having an almost small aperture with respect to the rotational center of the lens holder 75. Therefore, when the lens holder 75 is rotated and the objective 35 is placed in the laser beam optical path, the tip 201 of the stylus 200 on the top surface of the lens holder 75 will come into contact with the leaf spring 211 of the micro switch 210 that is provided outside the lens holder 75 and functions as a contact position sensor and will press the leaf spring 211. When the leaf spring 211 is pressed, the switch of the lens position sensing circuit 210 will be closed, the small-aperture objective 35, or, CD objective 35, be located in a specific position, and a sense signal indicating that the small-aperture objective 35 has been selected and is in the effective state will be supplied to the objective identifying circuit 104. When the large-aperture objective 34 is placed in the laser beam optical path in place of the small-aperture objective 35, the tip 201 of the stylus 20 will be separated sufficiently from the leaf spring 211 of the micro switch 210, bringing the switch of the lens position sensing circuit 210 into an open state. As a result, a sense signal indicating that the small-aperture objective 35 is effective is not outputted and the fact that the relatively large-aperture objective 34 for DVD is identified the an objective identifying circuit 104. It has been known that micro switches, whose standards are prescribed by JIS C4505, are miniature switches with a small interval between contacts and provide open/close operation of the circuit through mechanical operation. In addition, micro switches have an operation mechanism that causes the variable contact to move from one fixed contact point to the other at high speed, regardless of the speed at which the switch is operated.

On the other hand, the stylus 200 is made of, for example, relatively flexible material, such as silicone rubber, and has its shape and dimensions optimized. Specifically, the stylus has a suitable spring property that applies pressure reliably to the micro switch 210. Since the micro switch is of the type responsive to very low pressure, even when the tip 201 is in contact with the leaf spring 211 of the micro switch 210, it has no adverse effect on the vibration characteristic or driving characteristic of the lens holder 75. Because of the spring property, when the objective 35 has been selected, the tip 201 continues pressing the leaf spring 211 of the micro switch 210 stably.

The micro switch is of the type that has been built in apparatuses in various fields and has achieved good results in terms of reliability and stability. Micro switches of this type whose unit price is low are commercially available. Therefore, even when the micro switch is built in the above-described sensing mechanism, a highly reliable, highly stable lens identifying mechanism can be realized without raising the cost of the apparatus.

While in the above embodiment, the sensing mechanism using a micro switch has been explained, the present invention is not limited to the micro switch. The invention may be applied to another sensing mechanism, as long as the sensing mechanism is an element that mechanically senses the pressure produced by the rotation of the lens holder.

In FIG. 20, a mechanism that senses a change in electrical resistance is used as a sensing mechanism that senses the lens position. Specifically, as shown in FIG. 20, on the top surface of the lens holder 75, a conductive stylus 300 made of thin phosphor bronze is provided. When one of the objectives 34 and 35 has been selected, the tip 301 of the stylus 300 is brought into contact with an electrical resistance element 310 located outside the lens holder 75. When the other objective has been selected, the tip 301 of the conductive stylus 300 is not brought into contact with the electrical resistance element 310.

In the embodiment of FIG. 20, the conductive stylus 300 is positioned on a diagonal extending from the objective 35 having an almost small aperture with respect to the rotational center of the lens holder 75. Therefore, when the lens holder 75 is rotated and the objective 35 is placed in the laser beam optical path, the tip 301 of the stylus 300 on the top surface of the lens holder 75 will come into contact with the electrical resistance element 310 provided outside the lens holder 75. The conductive stylus 300 is made of thin phosphor bronze. A lead wire 302 is connected to one end of the stylus. A lead wire 312 is connected to one end of the electrical resistance element 310. Both of the lead wires 301, 312 are connected to a lens position sensing circuit 210. When the tip 301 of the conductive stylus 300 is brought into contact with the electrical resistance element 310, the conductive stylus 300 comes into electrical contact with the electrical resistance element 310, allowing the sense current to flow. The current is sensed at the lens position sensing circuit 210. As a result, the small-aperture objective 35, or CD objective 35, is placed in a specific position and a sense signal indicating that the small-aperture objective 35 has been selected and is in the effective state is supplied to the objective identifying circuit 104. When the large-aperture objective 34 is placed in the laser beam optical path instead of the small-aperture objective 35, the tip 301 of the conductive stylus 300 is separated sufficiently from the electrical resistance element 310 and the lens position sensing circuit 210 is brought into the off state, preventing the sense current from being sensed. As a result, the sense signal indicating that the small-aperture objective 35 is effective is not outputted and the fact that the relatively large-aperture objective 34 for DVD is effective is recognized by the objective identifying circuit 104.

On the other hand, the conductive stylus 300 is made of relatively flexible material and has its shape and dimensions optimized. Specifically, the stylus has a suitable spring property that applies pressure reliably to the electrical resistance element 310. Therefore, even when the tip 301 is in contact with the electrical resistance element 310, it has no adverse effect on the vibration characteristic or driving characteristic of the lens holder 75. Because of the spring property, when the objective 35 has been selected, the tip 301 is kept in contact with the electrical resistance element 310 stably. Since the electrical resistance element 310 is fixed to a yoke 79 via an insulating adhesive 311, this prevents unnecessary current from flowing through the other parts even when current is allowed to flow through the electrical resistance element 310.

Both of the conductive stylus 300 and the electrical resistance element 310 are simple in structure and low in unit price. Therefore, even when the conductive stylus 300 and electrical resistance element 310 are built in the above-described sensing mechanism, this neither raises the cost of the apparatus nor makes the apparatus larger. By building the conductive stylus 300 and electrical resistance element 310 in the sensing mechanism, a highly reliable, highly stable lens identifying mechanism can be realized.

While in the present embodiment, the sensing mechanism in which the conductive stylus 300 and electrical resistance element 310 have been built has been explained, the sensing mechanism is not restricted to the conductive stylus 300 and electrical resistance element 310. As long as an element senses the pressure produced by the rotation of the lens holder in the form of a change in electrical resistance, the element may be used as the sensing mechanism.

In FIG. 21, a sensing mechanism based on the principle of electromagnetic induction is used as a sensing mechanism that senses the lens position. Specifically, as shown in FIG. 21, on the top surface of the lens holder 75, a thin plate 400 made of metal, such as aluminum, is provided. When one of the objectives 34 and 35 has been selected and placed in the optical path, the top surface 410 of the thin plate 400 is forced to face the tip 411 of an eddy current loss-type minute displacement sensor 410 located outside the lens holder. When the other objective has been selected, the top surface 401 of the thin plate 400 is moved to a place separate from the displacement sensor 410.

In the embodiment of FIG.. 21, the thin plate 400 is positioned on a diagonal extending from the objective 35 with an almost small aperture to the rotational center of the lens holder 75. Therefore, when the lens holder 75 is rotated and the objective 35 is placed in the laser beam optical path, the top surface 401 of the thin plate 400 provided on the top surface of the lens holder 75 is forced to face the tip 411 of the eddy current loss-type minute displacement sensor 410 outside the lens holder 75. The top surface 401 of the thin plate 400 and the tip 411 of the eddy current loss-type minute displacement sensor 410 are designed to stay out of contact with each other and maintain a spacing that assures the generation of a specific eddy current as a result of the operation of the focusing servo and tracking servo, even when the lens holder 75 moves up and down and rotates minutely. When the top surface 401 of the thin plate 400 is forced to face the tip 411 of the eddy current loss-type minute displacement sensor 410, eddy current develops at the top surface 401 of the thin plate 400. The eddy current is sensed by the minute displacement sensor 410, which outputs the sensing result as a sense signal. As a result, the small-aperture objective 35, or CD objective 35, is placed in a specific position and a sense signal indicating that the small-aperture objective 35 has been selected and is in the effective state is supplied to the objective identifying circuit 104. When the large-aperture objective 34 is placed in the laser beam optical path instead of the small-aperture objective 35, the top surface 401 of the thin plate 400 is separated sufficiently from the minute displacement sensor 410 and the minute displacement sensor 410 is brought into the off state, preventing the sense current from being sensed. As a result, the sense signal indicating that the small-aperture objective 35 is effective is not outputted and the fact that the relatively large-aperture objective 34 for DVD is effective is recognized by the objective identifying circuit 104.

It is known that the eddy current loss-type minute displacement sensor 410 senses the displacement of a body or the presence or absence of a body using the principle of electromagnetic induction. Specifically, eddy current is generated in the metal to be sensed by electromagnetic induction and the loss of power in the coil is converted into a voltage, which is used as a sense signal. Such a sensor is of the non-contact type, so that it has no effect on the lens holder 75 while the focusing servo and tracking servo are acting on the lens holder. Additionally, in the present embodiment, neither the position nor displacement of the object to be sensed need be measured with high accuracy, as long as the presence or absence of the object to be sensed is sensed. Therefore, use of the minute displacement sensor 410 whose unit price is low and has a limited function will accomplish the purpose sufficiently. Therefore, even when the minute displacement sensor 410 is built in the above-described sensing mechanism, a highly reliable, highly stable lens identifying mechanism can be realized without raising the cost of the apparatus.

While in the above embodiment, the sensing mechanism incorporating the eddy current loss-type minute displacement sensor 410 has been explained, the present invention is not limited to the eddy current loss-type minute displacement sensor 410. The invention may be applied to another sensing mechanism, as long as the sensing mechanism is an element that senses the rotation of the lens holder under the principle of electromagnetic induction, such as an element of the differential transformer type or a magnetic scale.

In FIG. 22, a sensing mechanism making use of a change in capacitance is used as the sensing mechanism that senses the lens position. As shown in FIG. 22, on the top surface of the lens holder 75, a thin plate 500 made of material with a high permittivity is provided. When one of the objectives 34 and 35 has been selected and the selected one is placed in the optical path, the tip 501 of the thin plate 500 is forced to intervene in the gap 513 between the sensor sections 511, 512 of a capacitance-type minute displacement sensor 510 located outside the lens holder. When the other objective has been selected, the thin plate 500 is moved to a place separate from the displacement sensor 510.

In the embodiment of FIG. 22, the thin plate 500 with a high permittivity is positioned on a diagonal extending from the objective 35 with an almost small aperture to the rotational center of the lens holder 75. Therefore, when the lens holder 75 is rotated and the objective 35 is placed in the laser beam optical path, the top surface 501 of the thin plate 500 provided on the top surface of the lens holder 75 is positioned between the pair of sensor sections 511, 512 made of a metal plate of the capacitance-type minute displacement sensor 510 provided outside the lens holder 75. The top surface 501 of the thin plate 500 and the pair of sensor sections 511 and 512 of the capacitance-type minute displacement sensor 510 are designed to keep out of contact with each other and maintain a spacing that assures the specific change of capacitance as a result of the focusing servo and tracking servo being applied to the lens holder 75, even when the lens holder 75 moves up and down and rotates minutely. When the top surface 501 of the thin plate 500 is forced to intervene between the pair of sensor sections 511 and 512 of the capacitance-type minute displacement sensor 510, this is the same as the state where a material with a high permittivity is inserted between two metal plates, so if the pair as a whole is regarded as a capacitor, its capacitance increases. The change in capacitance is sensed by the minute displacement sensor 510, which outputs a sense signal. As a result, the small-aperture objective 35, or CD objective 35, is placed in a specific position and a sense signal indicating that the small-aperture objective 35 has been selected and is in the effective state is supplied to the objective identifying circuit 104. When the large-aperture objective 34 is placed in the laser beam optical path instead of the small-aperture objective 35, the top surface 501 of the thin plate 500 is separated sufficiently from the pair of sensor sections 511 and 512 of the capacitance-type minute displacement sensor 510 and the minute displacement sensor 510 is brought into the state where the sensor 510 senses small capacitance, preventing the sense current from being sensed. As a result, the sense signal indicating that the small-aperture objective 35 is effective is not outputted and the fact that the relatively large-aperture objective 34 for DVD is effective is recognized by the objective identifying circuit 104. Here, when the minute displacement sensor 510 is connected to a high-frequency generator circuit, a change in capacitance between the pair of sensor sections 511 and 512 will be sensed in the form of a change in resonant frequency, making it easy to sense the presence or absence of the thin plate 500.

The capacitance-type minute displacement sensor 510 is a sensor that senses a change in capacitance and is widely used to determine the displacement of an object or the presence or absence of an object. This sensor is based on the principle of a capacitor that when two metal plates with specific areas are forced to face each other in parallel with a specific distance between them and electrodes are connected to both of the metal plates, the amount of charge accumulated between the two metal plates varies with the permittivity of a substance inserted in the spacing.

Such a sensor is of the non-contact type, so that it has no effect on the operating characteristic of the lens holder 75 while the focusing servo and tracking servo are acting on the lens holder. Additionally, in the present embodiment, neither the position nor displacement of the object to be sensed need be measured with high accuracy, as long as only the presence or absence of the object to be sensed is sensed. Therefore, use of the minute displacement sensor 510 whose unit price is low and has a limited function will accomplish the purpose sufficiently. Therefore, even when the minute displacement sensor 510 is built in the above-described sensing mechanism, a highly reliable, highly stable lens identifying mechanism can be realized without raising the cost of the apparatus.

While in the above embodiment, the sensing mechanism incorporating the capacitance sensing minute displacement sensor 510 has been explained, the present invention is not limited to the capacitance sensing minute displacement sensor 510. The invention may be applied to another sensing mechanism, as long as the sensing mechanism is an element that senses the rotation of the lens holder under the principle of sensing a change in capacitance.

Figure 23:
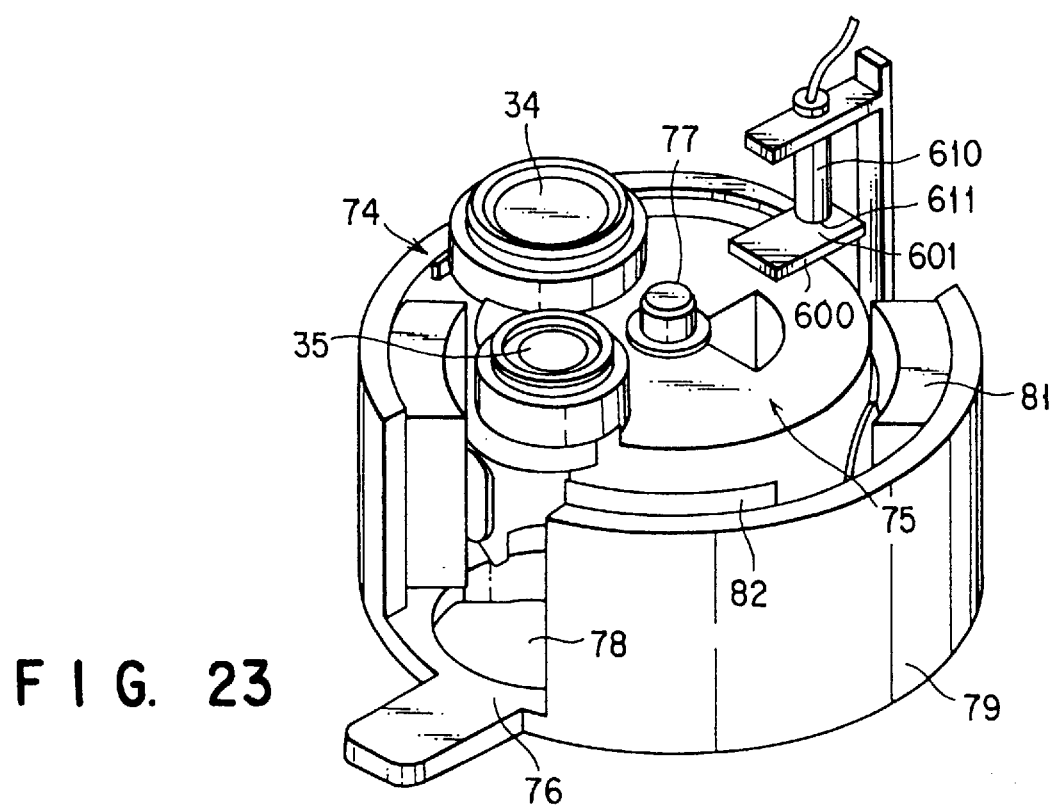

In FIG. 23, a sensing mechanism making use of supersonic waves is used as the sensing mechanism that senses the lens position. As shown in FIG. 23, on the top surface of the lens holder 75, a thin plate 600 is provided. When one of the objectives 34 and 35 has been selected and the selected one is placed in the optical path, the tip 601 of the thin plate 600 is forced to face the tip 611 of a supersonic minute displacement sensor 610 provided outside the lens holder. When the other objective has been selected, the top surface 601 of the thin plate 600 is moved to a place separate from the displacement sensor 610.

In the embodiment of FIG. 23, the thin plate 600 is positioned on a diagonal extending from the objective 35 with an almost small aperture to the rotational center of the lens holder 75. Therefore, when the lens holder 75 is rotated and the objective 35 is placed in the laser beam optical path, the top surface 601 of the thin plate 600 provided on the top surface of the lens holder 75 is forced to face the tip 411 of the supersonic minute displacement sensor 610 located outside the lens holder 75. The top surface 601 of the thin plate 600 and the tip 611 of the supersonic minute displacement sensor 610 are designed to keep out of contact with each other and maintain a spacing that assures the sensing of the change of supersonic waves as a result of the focusing servo and tracking servo being applied to the lens holder 75, even when the lens holder 75 moves up and down and rotates minutely. When the top surface 601 of the thin plate 600 is forced to face the tip 611 of the supersonic minute displacement sensor 610, the supersonic wave generated by the oscillating element of the minute displacement sensor 610 is reflected by the top surface 601 of the thin plate 600 and is sensed by the receiving element of the minute displacement sensor 610, which produces a sense signal. As a result, the small-aperture objective 35, or CD objective 35, is placed in a specific position and a sense signal indicating that the small-aperture objective 35 has been selected and is in the effective state is supplied to the objective identifying circuit 104. When the large-aperture objective 34 is placed in the laser beam optical path instead of the small-aperture objective 35, the top surface 601 of the thin plate 600 is separated sufficiently from the minute displacement sensor 610 and the supersonic wave emitted from the oscillating element is reflected by an optical unit 90 and is sensed by the receiving element of the minute displacement sensor 610. In this case, it takes more time for the supersonic wave to return to the receiving element of the minute displacement sensor 610 than when the top surface 601 of the thin plate 600 is forced to face the tip 611 of the supersonic minute displacement sensor 610, which prevents the sense current from being sensed. As a result, the sense signal indicating that the small-aperture objective 35 is effective is not outputted and the fact that the relatively large-aperture objective 34 for DVD is effective is recognized by the objective identifying circuit 104. The supersonic minute displacement sensor 610 measures the time required for the supersonic wave to return to the receiving element and memorizes the measured time. When the sensor is connected to a comparator circuit, it can produce a sense signal as described earlier.

The supersonic minute displacement sensor 610 determines the displacement of an object and the presence or absence of an object, making use of the properties of supersonic waves. Since supersonic waves have high frequencies, they are characterized in that they have high directivity and almost all of their energy reaches the target. One method of generating supersonic waves is an LC oscillation method in which direct current is supplied to a coil and a capacitor, for example. In addition, one method of receiving supersonic waves is a method of receiving supersonic waves with a piezoelectric element and directing the voltage signal from the piezoelectric element to an LC oscillating circuit, which then converts the voltage signal into an electric signal. Such a sensor is of the non-contact type, so that it has no effect on the operating characteristic of the lens holder 75 while the focusing servo and tracking servo are acting on the lens holder 75. Additionally, in the present embodiment, neither the position nor displacement of the object to be sensed need be measured with high accuracy, as long as only the presence or absence of the object to be sensed is sensed. Therefore, use of the minute displacement sensor 610 whose unit price is low and has a limited function will accomplish the purpose sufficiently. Therefore, even when the minute displacement sensor 610 is built in the above-described sensing mechanism, a highly reliable, highly stable lens identifying mechanism can be realized without raising the cost of the apparatus.

While in the above embodiment, the sensing mechanism incorporating the supersonic minute displacement sensor 610 has been explained, the present invention is not limited to the supersonic minute displacement sensor 610. The invention may be applied to another sensing mechanism, as long as the sensing mechanism is an element that senses the rotation of the lens holder under the principle making use of supersonic waves. For instance, the invention may be applied to a sensing mechanism where the supersonic oscillating section is placed so as to face the supersonic wave receiving section and a shielding plate is put between these sections according to the position of the lens.

As described above, with the sensing means shown in FIGS. 19 to 23, the position of the lens can be sensed reliably, the effective aperture of the objective placed in the laser optical path can be identified easily on the basis of the sensing result of the lens position, and the optical pickup can be controlled in a suitable mode according to the identification result.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An apparatus for searching a recording medium using a light beam, said apparatus comprising:
   a first objective lens and a second objective lens each having an optical axis;
   a light beam generator for generating a light beam directed along an optical path extending between the light beam generator and the recording medium;
   a lens holder having a rotational axis, said lens holder being constructed and arranged to support said first and second objective lenses;
   a reflecting element associated with said lens holder, said reflecting element being positioned and configured to reflect part of the light beam generated by said light beam generator and directed along the optical path extending between the light beam generator and the recording medium;

said lens holder being movable axially along the rotational axis thereof to thereby move one of the first and second objective lenses axially along its respective optical axis;

an objective lens driver constructed and arranged to rotate said lens holder to thereby select one of said first and second objective lenses by placing the selected objective lens in the optical path of the light beam generated by the light beam generator so that the selected objective lens focuses the light beam on the recording medium, said objective lens driver being constructed and arranged to move said lens holder axially along the optical axis of the selected objective lens to thereby adjust the focusing of the light beam by the selected objective lens and rotate said lens holder to thereby cause the selected objective lens to track a desired area of the recording medium; and an objective lens identifier constructed and arranged to sense the part of the light beam reflected by said reflecting element and identify which one of the first and second objective lenses has been selected and placed in the optical path of said light beam.

2. An apparatus according to claim 1, wherein said objective lens driver includes:

first and second coils; and first and second magnets, said magnets and coils being positioned and configured such that (1) energizing said first coil rotates said lens holder such that said first objective lens is selected and placed in the aforesaid optical path of the light beam generated by said light beam generator, (2) energizing said second coil when said first objective lens is selected moves said lens holder axially along its rotational axis to thereby adjust the focusing of the light beam as it passes through said first objective lens to the recording medium;

(3) energizing said second coil rotates said lens holder such that said second objective lens is selected and placed in the aforesaid optical path of the light beam generated by said light beam generator, (4) energizing said second coil when said second objective lens is selected moves said lens holder along its rotational axis to thereby adjust the focusing of the light beam as it passes through said second objective lens to the recording medium.

3. An apparatus according to claim 2, wherein said first magnet, first coil, second magnet, and second coil are arranged symmetrically with respect to the rotational axis of said lens holder.

4. An apparatus according to claim 2, wherein said objective lens identifier includes a sensor for sensing part of the reflected light beam and generating a sense signal, and an identification signal generator for generating an objective lens identification signal as a result of the sense signal.

5. An apparatus according to claim 4, wherein said objective lens identifier includes a switching circuit that, in response to said identification signal, switches at least one of said coils from a control circuit that controls a tracking operation to a control circuit that controls a focusing operation and also switches the same number of coils from the control circuit that controls a focusing operating to the control circuit that controls a tracking operation.

6. An apparatus for searching a recording medium having a track with a light beam, said apparatus comprising:

first and second objective lenses each having an optical axis, said optical axes being substantially parallel to one another;

a light beam generator for generating a light beam which travels along an optical path between the light beam generator and the recording medium;

a lens holder having a rotational axis substantially parallel with the optical axes of said first and second objective lenses, said lens holder being constructed and arranged to support said first and second objective lenses, said lens holder being rotatable about and movable axially along the rotational axis thereof;

a mode sensing device positioned and configured to sense when said first objective lens is located in the optical path of said light beam and when said second objective lens is located in the optical path of said light beam, said mode sensing device including a reflecting element associated with said lens holder for reflecting a part of the light beam and a sensor for sensing the reflected part of the light beam and generating a sensing signal indicating whether said first objective lens or said second objective lens is located in the optical path of said light beam;

first and second coils fixed to the lens holder and arranged around said rotational axis thereof;

first and second magnets facing the first and second coils respectively, said first and second magnets being spaced apart from said first and second coils;

a switching signal generator for generating a switching signal to energize one of the first and second coils, the lens holder being rotatable to move said first objective lens into the optical path of said light beam when the switching signal is supplied to the first coils and to move the second objective lens into the optical path of said light beam when the switching signal is supplied to the second coils;

a signal generator constructed and arranged to generate a focusing signal and a tracking signal in response to the light beam reflected from the recording medium;

the focusing signal being supplied to the second coil when the first objective lens is located in the optical path and to the first coil when the second objective lens is located in the optical path to thereby move the lens holder along its rotational axis such that an associated one of the first and second objective lenses placed in the optical path of the light beam focuses the light beam on the recording medium; and the tracking signal being supplied to the first coil when the first objective lens is located in the optical path and to the second coil when the second objective lens is located in the optical path to thereby rotate the lens holder about its rotational axis such that the associated one of the first and second objective lenses placed in the optical path of the light beam guides the light beam to the track.

7. An apparatus according to claim 6, wherein the first and second objective lenses have different optical characteristics for focusing a light beam on the optical recording medium.

8. An apparatus according to claim 6, wherein said first magnet, first coil, second magnet, and second coil are arranged symmetrically with respect to the rotational axis of said lens holder.

* * * * *